United States Patent
Taguchi et al.

(10) Patent No.: US 6,915,229 B2
(45) Date of Patent: Jul. 5, 2005

(54) METHOD AND SYSTEM FOR REGISTERING IDENTIFICATION OF TIRE AIR PRESSURE SENSOR DEVICE

(75) Inventors: Akihiro Taguchi, Oobu (JP); Ryozo Okumura, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/616,912

(22) Filed: Jul. 11, 2003

(65) Prior Publication Data

US 2004/0019448 A1 Jan. 29, 2004

(30) Foreign Application Priority Data

Jul. 24, 2002 (JP) .......................... 2002-214997

(51) Int. Cl.[7] .......................... B60C 23/02; G01M 17/00
(52) U.S. Cl. .......................... 702/138; 702/98; 73/146.5; 340/442; 340/445; 340/447; 701/1; 701/29; 701/32; 701/33
(58) Field of Search .......................... 702/138, 114, 702/116, 98, 47; 340/447, 10.41, 445, 442; 73/146.5; 200/61.22; 701/29.1

(56) References Cited

U.S. PATENT DOCUMENTS

| | | | | |
|---|---|---|---|---|
| 4,319,220 A | * | 3/1982 | Pappas et al. | 340/447 |
| 4,695,823 A | * | 9/1987 | Vernon | 340/447 |
| 4,730,188 A | * | 3/1988 | Milheiser | 340/825 |
| 4,734,674 A | * | 3/1988 | Thomas et al. | 340/447 |
| 5,109,213 A | * | 4/1992 | Williams | 340/447 |
| 5,218,861 A | * | 6/1993 | Brown et al. | 73/146.5 |
| 5,602,524 A | | 2/1997 | Mock et al. | |

FOREIGN PATENT DOCUMENTS

| | | |
|---|---|---|
| JP | 2001-80321 | 3/2001 |
| JP | 3212311 | 7/2001 |
| JP | A-2003-211924 | 7/2003 |
| JP | A-2003-242585 | 8/2003 |

* cited by examiner

*Primary Examiner*—John Barlow
*Assistant Examiner*—Hien Vo
(74) *Attorney, Agent, or Firm*—Posz Law Group, PLC

(57) ABSTRACT

A system has a memory in a vehicle for registering an identification of a tire air pressure sensor device in the memory. The tire air pressure sensor device is provided for a tire of the vehicle. The system further comprises a receiving unit configured to receive an unlikely signal which is transmitted from the tire air pressure sensor device. The unlikely signal is unlikely to be transmitted therefrom under normal circumstances. The system also comprises a first registering unit configured to register the identification of the tire air pressure sensor device in the memory in response to the receive of the unlikely signal.

30 Claims, 11 Drawing Sheets

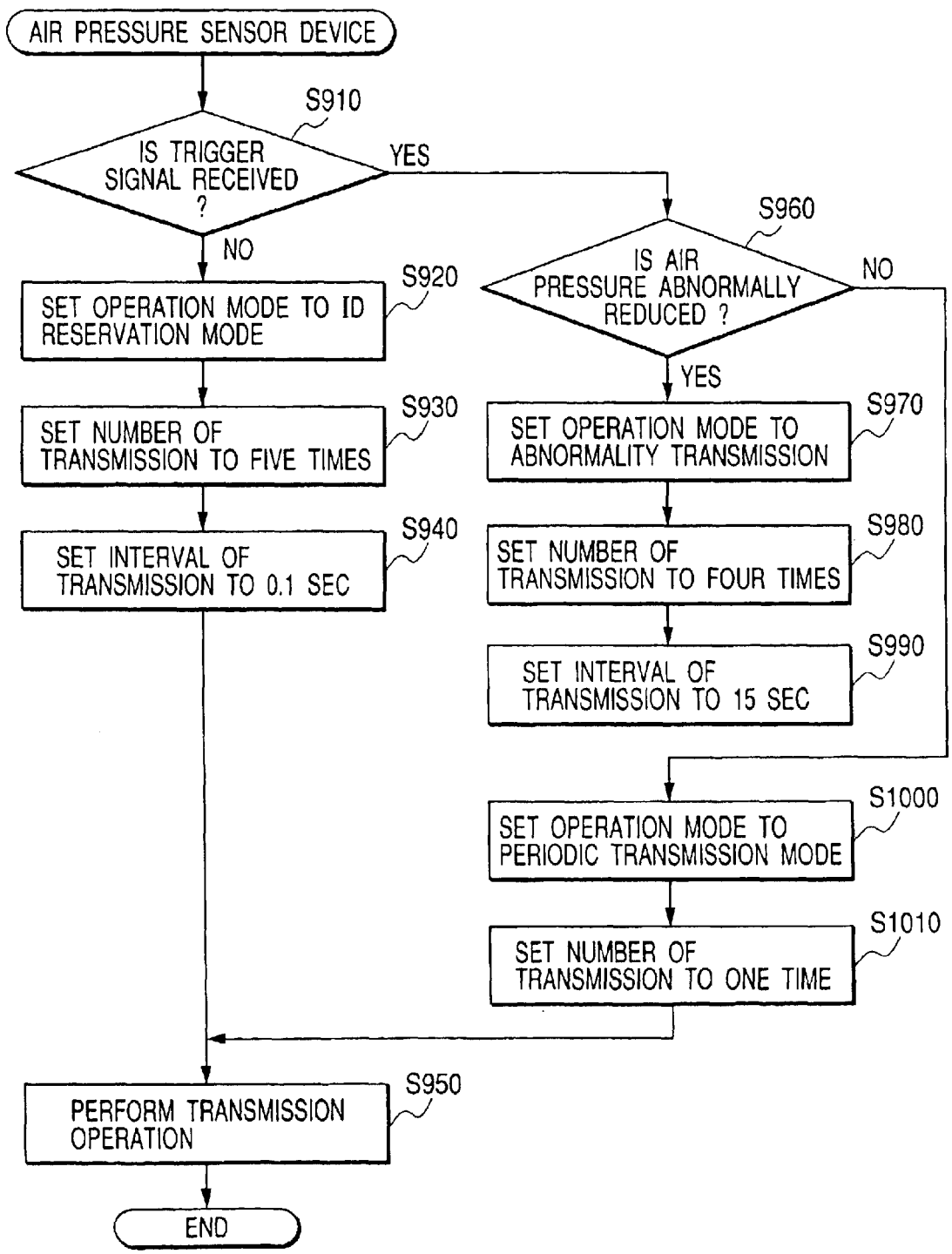

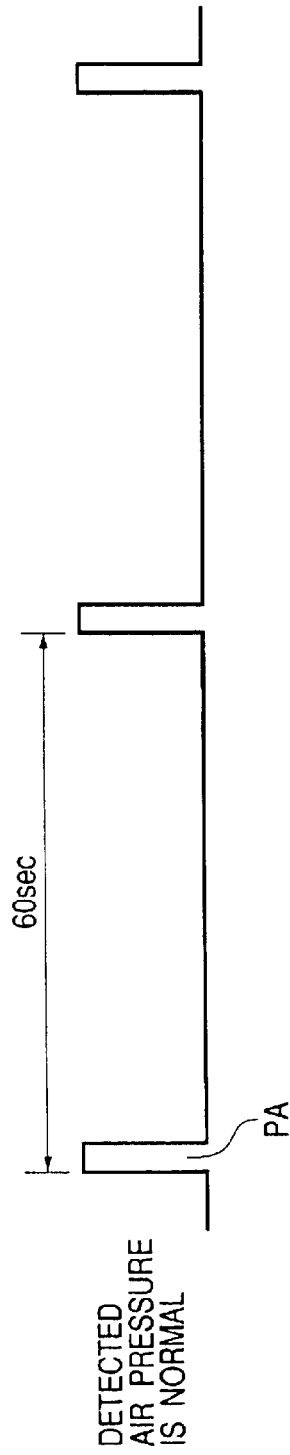
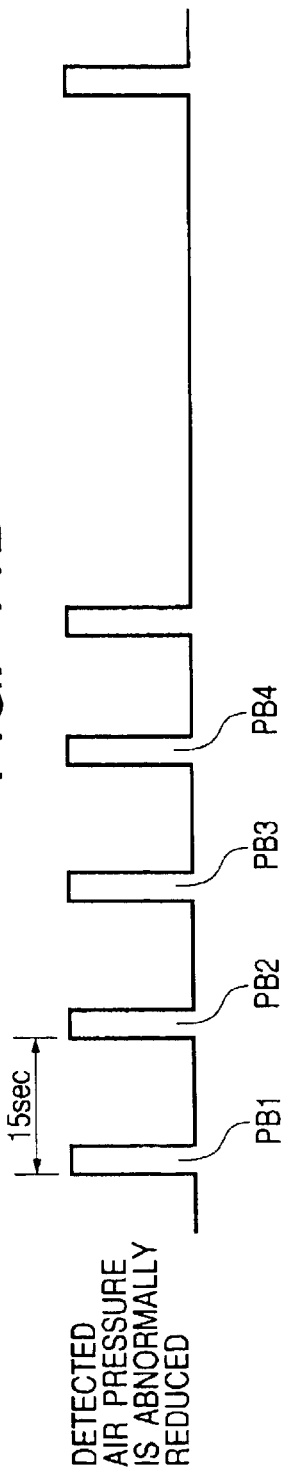
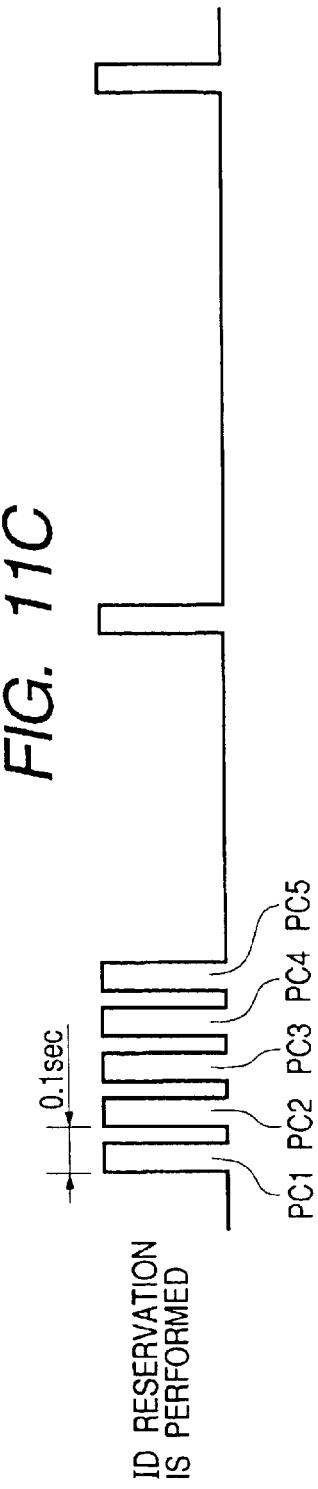

METHOD AND SYSTEM FOR REGISTERING IDENTIFICATION OF TIRE AIR PRESSURE SENSOR DEVICE

BACKGROUND OF THE INVENTION

1. Field of the Invention

The present invention relates to method and system for registering an identification of a tire in a vehicle.

2. Description of the Related Art

Japanese Granted Patent Publication NO. 3212311 is known as one of conventional tire air pressure monitoring systems.

The above conventional tire air pressure monitoring system has air-pressure sensors fitted to tires of a vehicle body, respectively, and a tire air pressure monitoring unit installed in the vehicle body.

Each of the air-pressure sensors is adapted to detect an air pressure in each tire and transmit the detected air pressure with each identification data, referred to simply as, "sensor ID", of each sensor. The tire air pressure monitoring unit is configured to receive each detected air pressure including each sensor ID. The tire air pressure monitoring unit is configured to determine whether or not the detected air pressure of the at least one of the tires is abnormal, and, when determining that the detected air pressure of the at least one of the tires is abnormal, to indicate the abnormality of the at least one of the tires on an indicator of the vehicle body, warning the abnormality.

Each sensor ID of each air-pressure sensor is registered on a memory of the tire air pressure monitoring unit so that the tire air pressure monitoring unit verifies each sensor ID included in each of the received data against each sensor ID registered on the memory, determining whether or not the received data is from one of the air-pressure sensors of the tires of the own vehicle body.

Each sensor ID is assigned to be registered to each air pressure sensor when each air-pressure sensor is shipped from a sensor maker.

When assembling a vehicle by using the air-pressure sensors, after the air-pressure sensors are fitted to the tires of the vehicle under assembly, a shifting unit or element of the vehicle under assembly makes shift the operation mode of the tire air pressure monitoring unit from the usual mode for monitoring each air pressure in each tire to the ID registration mode so that the tire air pressure monitoring unit receives each sensor ID transmitted in a constant period from each air-pressure sensor, registering each of the received sensor IDs on its memory.

The air-pressure sensor, however, repeatedly transmits the own sensor ID in a constant period, so that, when performing a sensor ID registration operation in a place at which many vehicles exist, such as auto factory, there is the possibility that the tire air pressure monitoring unit registers other sensor IDs transmitted from other air-pressure sensors of other vehicles in error.

In addition, the conventional ID registering method needs the shifting unit or element which allows the tire air pressure monitoring unit to shift the operation mode to the ID registration mode, causing the cost of the tire air pressure monitoring system to be high.

When, as the shifting unit or element for shifting the operation mode of the tire air pressure monitoring unit to the ID registration mode, a switch is provided for the tire air pressure monitoring system, in cases where the switch is turned on in error while the vehicle is moving, the operation mode of the tire air pressure monitoring unit shifts to the ID registration mode so that the original function of the tire air pressure monitoring unit for monitoring each air pressure in each tire may not be performed.

SUMMARY OF THE INVENTION

The invention is made on the background of the need of the related arts.

Accordingly, it is an object of the invention to prevent, when registering a sensor ID transmitted from a sensor in a vehicle, an occurrence of misregistration due to interference of other sensor IDs transmitted from other sensors of other vehicles.

In order to achieve the object, according to one aspect of the present invention, there is provided a method of registering an identification of a tire air pressure sensor device in a tire air pressure monitoring unit in a vehicle, in which the tire air pressure sensor device is provided for a tire of the vehicle and communicable with the tire air pressure monitoring unit, the method comprising: setting an identification registration condition to the tire air pressure monitoring unit, the identification registration condition allowing the tire air pressure monitoring unit to register the identification of the tire air pressure sensor device when an unlikely signal is received, the unlikely signal being unlikely to be transmitted under normal circumstances; transmitting the unlikely signal from the tire air pressure sensor device; receiving the unlikely signal by the tire air pressure monitoring unit; and firstly registering, by the tire air pressure monitoring unit, the identification of the tire air pressure sensor device according to the identification registration condition in response to the receive of the unlikely signal.

In order to achieve the object, according to another aspect of the present invention, there is provided a system with a memory in a vehicle for registering an identification of a tire air pressure sensor device in the memory, in which the tire air pressure sensor device is provided for a tire of the vehicle, the system comprising: a receiving unit configured to receive an unlikely signal which is transmitted from the tire air pressure sensor device, the unlikely signal being unlikely to be transmitted therefrom under normal circumstances; and a first registering unit configured to register identification of the tire air pressure sensor device in the memory in response to the receive of the unlikely signal.

In order to achieve the object, according to further aspect of the present invention, there is provided a tire air pressure sensor device provided for a tire of a vehicle, the tire air pressure sensor device comprising: an air pressure sensor configured to detect an air pressure in the tire; a memory in which an identification of the tire air pressure sensor device is stored; a transmitting unit configured to transmit a transmission signal, the transmission signal including the air pressure detected by the air pressure sensor and the identification; a receiving unit configured to receive a trigger signal transmitted from an exterior of the tire air pressure sensor device; and a determining unit configured to determine whether the receiving unit receives the trigger signal, wherein the transmitting unit is configured to transmit an unlikely signal when the determining unit determines that the receiving unit receives the trigger signal, the unlikely signal being unlikely to be transmitted from the transmitting unit under normal circumstances.

In order to achieve the object, according to still further aspect of the present invention, there is provided a program product readable by a computer, in which the computer is installed in a vehicle and is communicable with a tire air pressure sensor device, and the tire air pressure sensor device is provided for a tire of the vehicle, the program product comprising: first means for causing the computer to receive an unlikely signal which is transmitted from the tire air pressure sensor device, the unlikely signal being unlikely to be transmitted therefrom under normal circumstances; and second means for causing the computer to register the identification of the tire air pressure sensor device in a memory in response to the receive of the unlikely signal.

According to the one, another, further and still further aspects of the invention, the identification registration condition, which allows the tire air pressure monitoring unit to register the identification of the tire air pressure sensor device when an unlikely signal, is received is set so that, when the unlikely signal is received, the identification of the tire air pressure sensor device is registered according to the identification registration condition in response to the receive of the unlikely signal.

That is, because other tire air pressure sensor devices transmit their identifications which are not unlikely signals, it is possible to distinguish the identification of the own tire air pressure sensor device from the other identifications of other tire air pressure sensor devices, preventing the other identifications from being registered in error.

BRIEF DESCRIPTION OF THE DRAWINGS

Other objects and aspects of the invention will become apparent from the following description of embodiments with reference to the accompanying drawings in which:

FIG. 10 is a flowchart schematically illustrating processes of each of air pressure sensor devices shown in FIG. 8 according to the fourth embodiment;

FIG. 11A is a sequence chart illustrating pulse signals transmitted in a periodical mode of each of the air pressure sensor devices shown in FIG. 8;

FIG. 11B is a sequence chart illustrating pulse signals transmitted in an abnormality transmission mode of each of the air pressure sensor devices shown in FIG. 8; and FIG. 11C is a sequence chart illustrating pulse signals transmitted in an ID registration mode of each of the air pressure sensor devices shown in FIG. 8.

DETAILED DESCRIPTION OF EMBODIMENTS OF THE INVENTION

Embodiments of the invention will be described hereinafter with reference to the accompanying drawings.

(First Embodiment)

Figure 1:
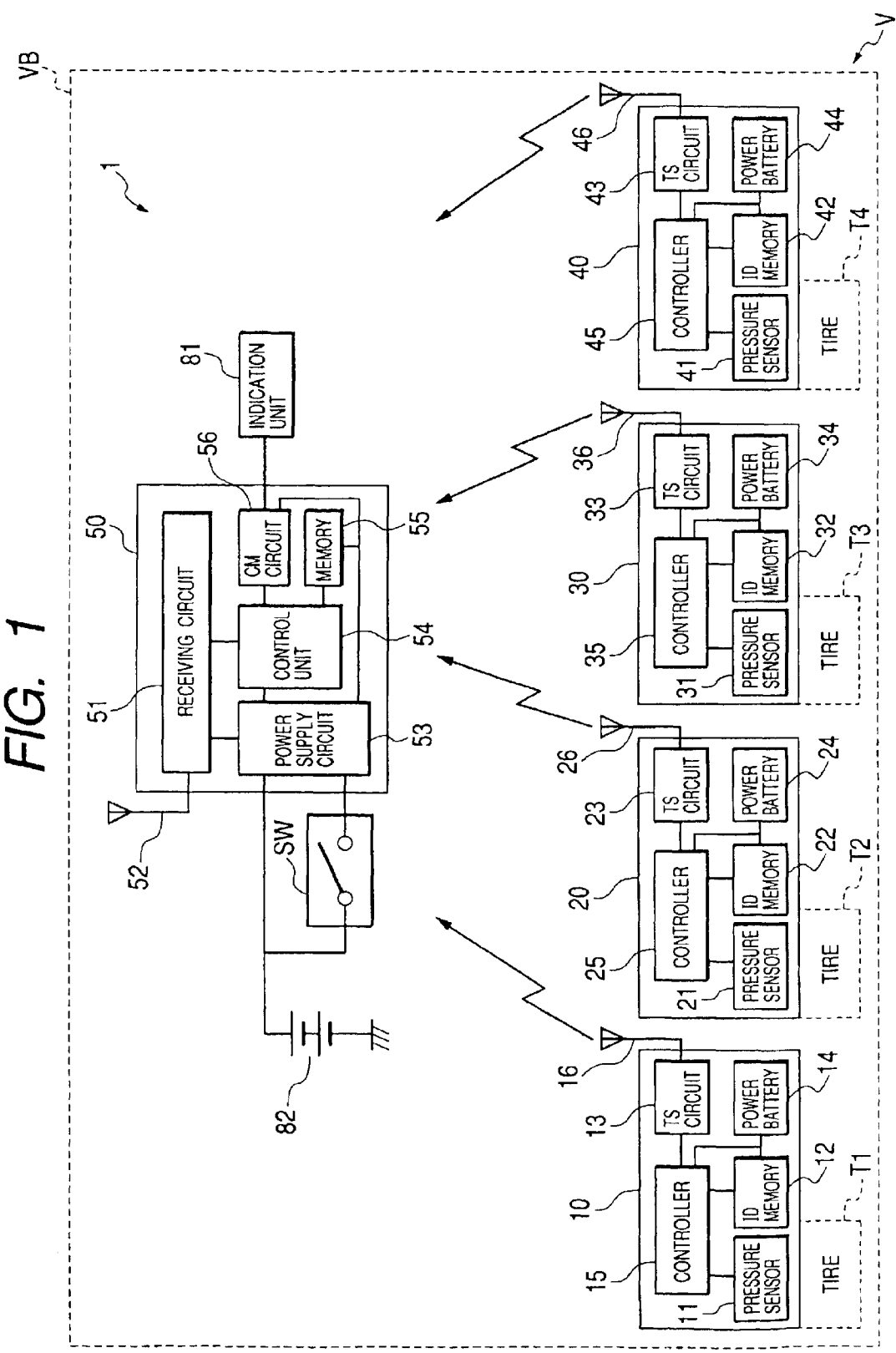
FIG. 1 is a block diagram schematically illustrating a structure of tire air pressure monitoring system installed in a vehicle body of a vehicle according to a first embodiment of the invention.

FIG. 1 is a block diagram schematically illustrating a structure of tire air pressure monitoring system 1 installed in a vehicle body VB of a vehicle V according to a first embodiment of the invention.

As shown in FIG. 1, the tire air pressure monitoring system 1 comprises air pressure sensor devices 10, 20, 30 and 40 fitted to the tires T1, T2, T3 and T4 of the vehicle body VB, respectively, and a tire air pressure monitoring unit 50 installed in the vehicle body VB.

The air pressure sensor device 10 comprises a pressure sensor 11 configured to detect an air pressure in the corresponding tire T1, an ID memory 12 for storing the identification of the own pressure sensor 11, which is referred to as sensor ID, a transmission circuit (TS circuit) 13 electrically connected to an antenna 16 for transmitting the sensor ID through the antenna 16, a power battery 14 and a controller 15 electrically connected to the pressure sensor 11, the ID memory 12, the transmission circuit 13 and the power battery 14 and operative to control them.

The power battery 14 is electrically connected to the ID memory 12 and the controller 15 for supplying power to the ID memory 12 and the controller 15. The pressure sensor 11 and the transmission circuit 13 receive power supplied from the controller 15.

Each of other air pressure sensor devices 20, 30 and 40 has the same structure of the air pressure sensor device 10. That is, the air pressure sensor devices 20, 30 and 40 comprise the pressure sensors 21, 31 and 41, the ID memory 12, 22 and 32, the transmission circuit 13, 23 and 33, the power battery 24, 34 and 44, the controller 25, 35 and 45 and the antenna 26, 36 and 46, respectively.

A valve is fitted to each of the tires T1~T4 to be communicable with an inside thereof, and each of the antennas 16, 26, 36 and 46 is served as a base attached to the inlet of the valve so that, when the valve is opened, air is pumped through the valve into each of the tires T1~T4.

Nonvolatile and rewritable memory element, such as EEPROM (Electrically Erasable and Programmable ROM), can be used as each of the ID memories 12, 22, 32 and 42.

The tire air pressure monitoring unit 50 comprises a receiving circuit 51 and an antenna 52 electrically connected thereto so that the receiving circuit 51 can receive signals through the antenna 52. The tire air pressure monitoring unit 50 also comprises a power supply circuit 53, a control unit (computer) 54, a memory 55 and a communication circuit (CM circuit) 56.

An in-vehicle battery 82 is installed in the vehicle body VB and electrically connected through a switch SW to the power supply circuit 53 so as to supply power through the power supply circuit 53 to each of the receiving circuit 51, the control unit 54, the memory 55 and the communication circuit 56.

The control unit 54 is electrically connected to each of the receiving circuit 51, the power supply circuit 53, the control unit 54, the memory 55 and the communication circuit 56 and operative to control them.

The control unit 54 has a timer (registration timer) TM1 for counting up time by the second and can reset the count value C1 of the timer TM1 to zero (zero second).

Figure 3:
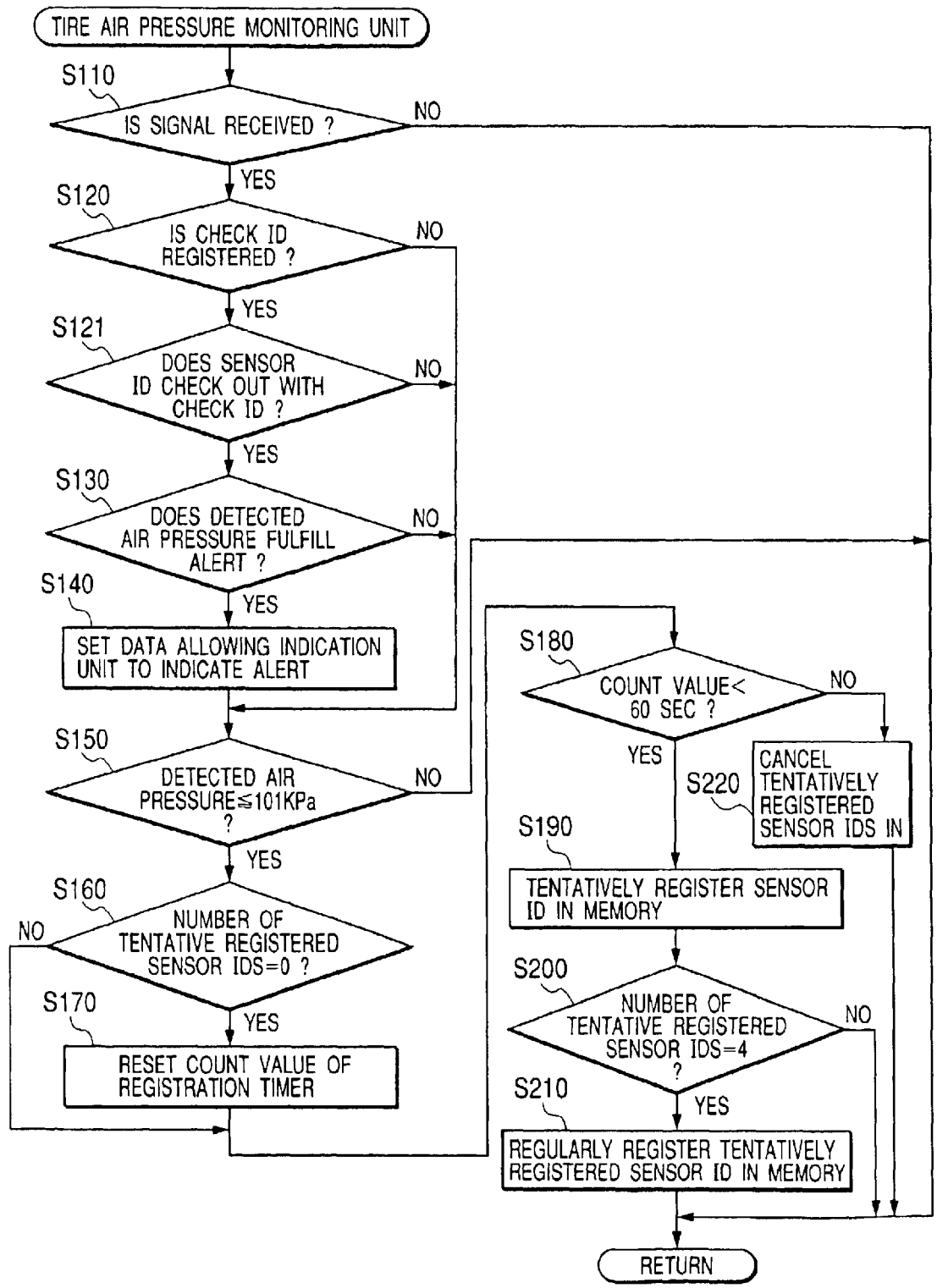
FIG. 3 is a flow chart schematically illustrating processes of tire air pressure monitoring unit shown in FIG. 1 according to the first embodiment.

In the memory 55, a program (program product) which causes the control unit 54 to perform the processes shown in afterward FIG. 3 is installed.

The communication circuit 56 is configured to transmit indication data to an indication unit 81, such as an indicator, an LED (light emitting diode) or the like, installed in the vehicle body VB.

Each sensor ID of each of the air pressure sensor devices 10, 20, 30 and 40 fitted to each of the tires T1, T2 T3 and T4 can be registered in the memory 55 as "check ID" by processes of the control unit 54 shown in afterward FIG. 3.

Figure 2:
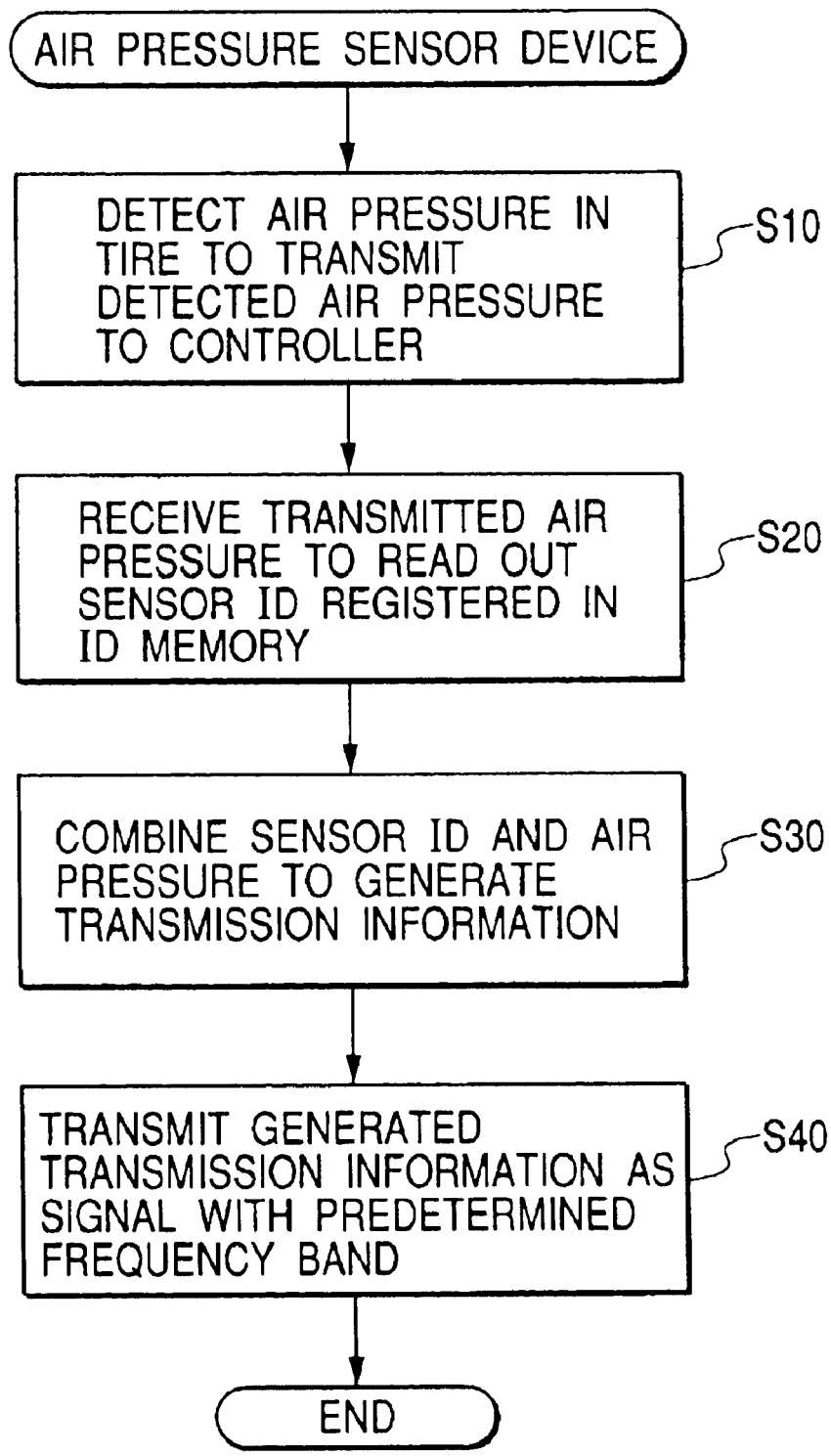
FIG. 2 is a flowchart schematically illustrating processes of each of air pressure sensor devices shown in FIG. 1 according to the first embodiment.

Each of the air pressure sensor devices 10, 20, 30 and 40 performs processes shown in FIG. 2.

That is, each of the pressure sensors 11, 21, 31 and 41 of each of the air pressure sensor devices 10, 20, 30 and 40 detects an air pressure in each of the corresponding tires T1, T2, T3 and T4 to transmit each of the detected air pressures to each of the controllers 15, 25, 35 and 45 (Step S10).

Each of the controllers 15, 25, 35 and 45 receives each of the, transmitted air pressures and reads out each of the sensor IDs registered in the ID memories 12, 22, 32 and 42 therefrom (Step S20).

Then, each of the controllers 15, 25, 35 and 45 combines each of the received air pressures and each of the read sensor IDs every sensor to generate transmission information (Step S30), and transmits the generated transmission information as a signal with a predetermined frequency band through each of the transmission circuits 13, 23, 33 and 43 (Step S40).

These processes (Steps S10–S40) of each of the air pressure sensor devices 10, 20, 30 and 40 are periodically performed every predetermined time interval.

The tire air pressure monitoring unit 50 periodically executes tire air pressure monitoring processes shown in FIG. 3 in accordance with the program installed in the memory 55.

That is, the control unit 54 of the tire air pressure monitoring unit 50 determines whether or not the signals each with the predetermined frequency band are received (Step S110).

When determining that no signals each with the predetermined frequency band are received, that is, the determination in Step S110 is NO, the control unit 54 of the tire air pressure monitoring unit 50 terminates execution of the processes to return the process in Step S110.

On the other hand, when at least one of the signals which has the predetermined frequency band is received through the antenna 52 and the receiving circuit 51 to be transmitted to the control unit 54, the control unit 54 determines that the at least one of signals which has the predetermined frequency band is received, that is, the determination in Step S110 is YES.

Next, the control unit 54 determines whether or not at least one of check IDs is registered in the memory 55 (Step S120), and when determining that no check IDs are registered in the memory 55, that is, the determination in Step S120 is NO, the control unit 54 shifts to afterward Step S150.

When determining that the at least one of check IDs is registered in the memory 55, that is, the determination in Step S120 is YES, the control unit 54 reads out the at least one of the check IDs from the memory 55 to determine whether or not the at least one of the sensor IDs included in the at least one of received signals checks out with the at least one of check IDs (Step S121).

When determining that the at least one of sensor IDs does not check out with the at least one of check IDs, that is, the determination in Step S121 is NO, the control unit 54 shifts to afterward Step S150.

When determining that the at least one of sensor IDs checks out with the at least one of check IDs, that is, the determination in Step S121 is YES, the control unit 54 determines whether or not the at least one of detected air pressures included in the at least one of received signals fulfills a predetermined alert condition of each tire (Step S130). The predetermined alert condition, for example, includes a predetermined alert range of air pressures which requires raising an alert.

When determining that the at least one of detected air pressures is not within the predetermined alert range, the control unit 54 determines that the at least one of detected air pressures does not fulfill the predetermined alert condition, in other words, the determination in Step S130 is NO, the control unit 54 shifts to afterward Step S150.

On the other hand, when the at least one of detected air pressures is within the predetermined alert range, the control unit 54 determines that the at least one of detected air pressures fulfills the predetermined alert condition, in other words, the determination in Step S130 is YES, so that the control unit 54 sets the data allowing the indication unit 81 to indicate an alert (Step S140), whereby the indication unit 81 indicates an alert according to the set data.

On the other hand, when determining that the at least one of sensor IDs included in the at least one of received signals does not check out with the at least one of check IDs, that is, the determination in Step S121 is NO, the control unit 54 determines whether the at least one of the detected air pressures included in the received signals is no more than the atmosphere pressure of 101 kPa corresponding to the identification registration condition in the first embodiment (Step S150).

When determining that the at least one of detected air pressures included in the received signals is more than the atmosphere pressure of 101 kPa, that is, the determination in Step S150 is NO, the control unit 54 terminates execution of the processes to return the process in Step S110.

When determining that the at least one of detected air pressures included in the at least one of received signals is no more than the atmosphere pressure of 101 kPa, that is, the determination in Step S150 is YES, the control unit 54 determines whether or not a number of tentative registered sensor IDs in the memory 55 is zero (Step S160).

When determining that the number of tentative registered sensor IDs in the memory 55 is not zero, that is, the determination in Step S160 is NO, the control unit 54 shifts to afterward Step S180.

When determining that the number of tentative registered sensor IDs in the memory 55 is zero, that is, the determination in Step S160 is YES, the control unit 54 resets the count value C1 of the registration timer TM1 to zero (zero second) to make the registration timer TM1 start a count up (Step S170).

Next, the control unit 54 determines whether or not the count value C1 of the registration timer TM1 is less than 60 second (see) (Step S180).

In a case of determining that the count value C1 of the registration timer TM1 is less than 60 sec, that is, the determination in Step S180 is YES, the control unit 54 tentatively registers the sensor IDs included in the received signals in the memory 55 (Step S190) and determines whether or not the number of the tentatively registered sensor IDs becomes 4 (Step S200).

When determining that the number of the tentative registered sensor IDs becomes 4, that is, the determination in Step S200 is YES, the control unit 54 regularly registers the tentatively registered sensor IDs as the check IDs in the memory 55 (Step S210).

On the other hand, when determining that the number of the tentative registered sensor IDs does not become 4, that is, the determination in Step S200 is NO, the control unit 54 terminates execution of the processes to return the process in Step S110.

In addition, when determining that the count value C1 of the registration timer TM1 is no less than 60 sec, that is, the determination in Step S180 is NO, the control unit 54 cancels the tentatively registered sensor IDs in the memory 55 (Step S220).

Next, working and operations for registering sensor IDs of the air pressure sensor devices 10, 20, 30 and 40 in the memory 55 according to the first embodiment will be described hereinafter.

At first, the valves of the tires T1, T2, T3 and T4 are opened so that all four tires T1, T2, T3 and T4 are deflated. That is, deflation of all four tires T1, T2, T3 and T4 makes them substantially simultaneously punctured.

At that time, in Steps S10 to S40, each of the air pressure sensor devices 10, 20, 30 and 40 transmits the transmission information including each of the air pressures which represents a puncture of each of the tires T1, T2, T3 and T4. That is, each of the air pressures representing a puncture of each of the tires T1, T2, T3 and T4 is no more than the atmosphere pressure of 101 kPa.

When no check IDs are registered, as shown in FIG. 3, the determination of the control unit 54 in Step S120 is NO so that the processes in Step S150 to Step S210 are performed by the control unit 54 whereby the sensor IDs substantially simultaneously received with the detected air pressures that are no more than the atmosphere pressure of 101 kPa are sequentially tentatively registered in the memory 55.

When the number of tentatively registered sensor IDs gets to be 4 within 60 sec, the tentatively registered sensor IDs are regularly registered in the memory 55 as the check IDs (see Steps S200 and S210).

Incidentally, it is not necessary to substantially simultaneously open the valves of the tires T1, T2, T3 and T4. Making all four tires T1, T2, T3 and T4 punctured allows the number of tentatively registered sensor IDs in the memory 55 to become 4 within 60 sec while the processes in Step S150 to Step S220 are repeatedly performed, thereby regularly registering the tentatively registered sensor IDs in the memory 55 as the check IDs.

The state that all four tires of each of other vehicles are punctured is unlikely to be happened in normal circumstances including, for example, in cases where the other vehicles are normal, such as the other vehicles are normally running.

It is possible, therefore, to prevent other sensor IDs of tires of the other vehicles from being registered in error in the memory 55 of the own vehicle V according to signals transmitted from other sensor devices of the other vehicles.

Assuming that tires of at least one of other vehicles are punctured so that the sensor IDs of the punctured tires of the at least one of other vehicles are received by the control unit 54 of the own vehicle V to be tentatively registered in the memory 55, the tentative registered sensor IDs of the at least one of other vehicles are canceled every 60 sec by the processes of the control unit 54 shown in Steps S180 and S220 because other remained tire in the at least one of other vehicles is not punctured, thereby preventing that the determination in Step S200 is YES.

As a result, in the first embodiment of the present invention, it is possible to prevent other sensor IDs of tires of other vehicles from being registered in error in the memory 55 of the own vehicle due to interference of the other sensor IDs transmitted from other vehicles.

In addition, in the first embodiment of the present invention, the configuration of the tire air pressure monitoring system 1 allows the sensor ID registration processes to be performed during the usual tire air pressure monitoring processes, making it unnecessary to add switch elements for shifting the control unit 54 of the tire air pressure monitoring unit 50 to an ID registration mode. Moreover, the configuration of the tire air pressure monitoring system 1 makes unnecessary any tools for registering sensor IDs.

Furthermore, in the first embodiment of the present invention, the configuration of the tire air pressure monitoring system 1 allows the sensor ID registration processes to be performed without shifting the control unit 54 of the tire air pressure monitoring unit 50 to an ID registration mode, making it possible to prevent the tire air pressure monitoring unit 50 from shifting to an ID registration mode in error in a state that the tire air pressure monitoring unit 50 is supposed to perform a usual operation, such as in a state that the vehicle V is running.

In addition, in the first embodiment of the present invention, the configuration of the tire air pressure monitoring system 1 permits the sensor ID registration processes to be performed during the usual tire air pressure monitoring processes, making it possible to accurately indicate an alert when at least one of tires T1 to T4 fulfills the predetermined alert condition even in a case of starting the ID registration processes.

(Second Embodiment)

Next, a second embodiment of the invention will be described hereinafter. Incidentally, in the second embodiment, a program (program product) installed in the memory 55 is different from the program related to the first embodiment, and a hardware configuration of the tire air pressure monitoring system according to the second embodiment is substantially the same as the hardware configuration of the tire air pressure monitoring system 1 according to the first embodiment so that elements of the tire air pressure monitoring system according to the second embodiment are assigned to the same reference characteristics of the elements in FIG. 1.

Figure 4:
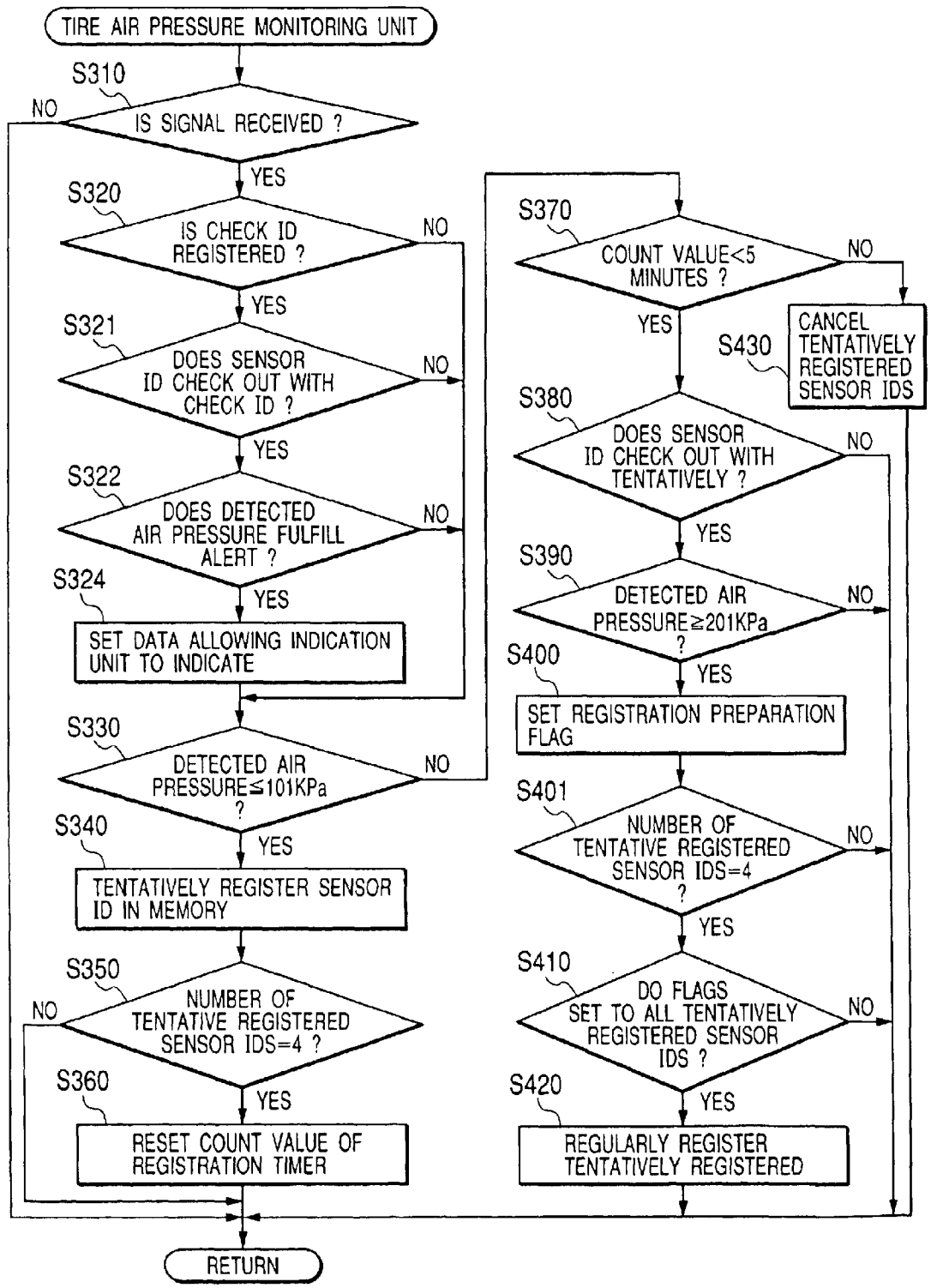
FIG. 4 is a flow chart schematically illustrating processes of tire air pressure monitoring unit according to a second embodiment of the invention.

In the tire air pressure monitoring system of the second embodiment, the air pressure monitoring unit 50 periodically executes tire air pressure monitoring processes shown in FIG. 4 in accordance with the program installed in the memory 55.

That is, the control unit 54 of the tire air pressure monitoring unit 50 determines whether or not the signals each with the predetermined frequency band are received (Step S310).

When determining that no signals each with the predetermined frequency band are received (the determination in Step S310 is NO), the control unit 54 of the tire air pressure monitoring unit 50 terminates execution of the processes to return the process in Step S310.

On the other hand, when at least one of the signals which has the predetermined frequency band is received through the antenna 52 and the receiving circuit 51 to be transmitted to the control unit 54, the control unit 54 determines that the at least one of signals which has the predetermined frequency band is received (the determination in Step S310 is YES).

Next, the control unit 54 determines whether or not at least one of check IDs is registered in the memory 55 (Step S320), and when determining that no check IDs are registered in the memory 55 (the determination in Step S320 is NO), the control unit 54 shifts to afterward Step S330.

When determining that the at least one of check IDs is registered in the memory 55 (the determination in Step S320 is YES), the control unit 54 reads out the at least one of check IDs from the memory 55 to determine whether or not the at least one of sensor IDs included in the at least one of received signals checks out with the at least one of check IDs (Step S321).

When determining that the at least one of sensor IDs does not check out with the at least one of check IDs, that is, the determination in Step S321 is NO, the control unit 54 shifts to afterward Step S330.

When determining that the at least one of sensor IDs checks out with the at least one of check IDs (the determination in Step S321 is YES), the control unit 54 determines whether or not the at least one of detected air pressures included in the received signals fulfills the predetermined alert condition of each tire (Step S322).

When determining that the at least one of detected air pressures does not fulfill the predetermined alert condition, in other words, the determination in Step S322 is NO, the control unit 54 shifts to afterward Step S330.

When the control unit 54 determines that the at least one of detected air pressures fulfills the predetermined alert condition (the determination in Step S322 is YES), the control unit 54 sets the data allowing the indication unit 81 to indicate an alert (Step S324), whereby the indication unit 81 indicates an alert according to the set data.

On the other hand, when determining that the at least one of sensor IDs included in the at least one of received signals does not check out with the at least one of check IDs (the determination in Step S322 is NO), the control unit 54 determines whether the at least one of detected air pressures included in the at least one of received signals is no more than the atmosphere pressure of 101 kPa (Step S330).

When determining that the at least one of detected air pressures included in the at least one of received signals is no more than the atmosphere pressure of 101 kPa (the determination in Step S330 is YES), the control unit 54 tentatively registers the at least one of sensor IDs included in the at least one of received signals in the memory 55 (Step S340) and determines whether or not the number of the tentative registered sensor IDs becomes 4 (Step S350).

When determining that the number of the tentative registered sensor IDs becomes 4 (the determination in Step S350 is YES), the control unit 54 resets the count value C1 of the registration timer TM1 to zero (zero second) to make the registration timer TM1 start a count up (Step S360).

On the other hand, when determining that the number of the tentative registered sensor IDs does not become 4 (the determination in Step S350 is NO), the control unit 54 terminates execution of the processes to return the process in Step S310.

When determining that the at least one of detected air pressures included in the at least one of received signals is more than the atmosphere pressure of 101 kPa (the determination in Step S330 is NO), the control unit 54 determines whether or not the count value C1 of the registration timer TM1 is less than 5 (five) minutes (min) (Step S370).

When determining that the count value C1 of the registration timer TM1 is less than 5 minutes (the determination in Step S370 is YES), the control unit 54 determines whether or not the at least one of sensor IDs included in the at least one of received signals checks out with the at least one of tentatively registered sensor IDs (Step S380).

When determining that the at least one of sensor IDs does not check out with the at least one of tentatively registered sensor IDs (the determination in Step S380 is NO), the control unit 54 terminates execution of the processes to return the process in Step S310.

On the other hand, when determining that the at least one of sensor IDs checks out with the at least one of tentatively registered sensor IDs (the determination in Step S380 is YES), the control unit 54 determines whether the at least one of detected air pressures included in the at least one of received signals is no less than the pressure of 201 kPa (Step S390). The pressure change from the pressure of 101 kPa to that of 202 kPa corresponds to the identification registration condition in the second embodiment.

When determining that the at least one of detected air pressures included in the at least one of received signals is less than the pressure of 201 kPa (the determination in Step S390 is NO), the control unit 54 terminates execution of the processes to return the process in Step S310.

When determining that the at least one of detected air pressures included in the at least one of received signals is no less than the pressure of 201 kPa (the determination in Step S390 is YES), the control unit 54 sets a registration preparation flag to the at least one of tentatively registered sensor IDs corresponding to the at least one of detected air pressures of the at least one of signals (Step S400).

Next, the control unit 54 determines whether or not the number of the tentatively registered sensor IDs becomes 4 (Step S401), and when determining that the number of the tentatively registered sensor IDs does not become 4 (the determination in Step S401 is NO), the control unit 54 terminates execution of the processes to return the process in Step S310.

When determining that the number of tentatively registered sensor IDs becomes 4 (the determination in Step S401 is YES), the control unit 54 determines whether or not the registration preparation flags are set to all four tentatively registered sensor IDs (Step S410).

When determining that the registration preparation flags are not set to all four tentatively registered sensor IDs (the determination in Step S410 is NO), the control unit 54 terminates execution of the processes to return the process in Step S310.

When determining that the registration preparation flags are set to all four tentatively registered sensor IDs (the determination in Step S410 is YES), the control unit 54 regularly registers the tentatively registered sensor IDs as the check IDs in the memory 55 (Step S420).

On the other hand, when determining that the count value C1 of the registration timer TM1 is no less than 5 minutes (the determination in Step S370 is NO), the control unit 54 cancels the tentatively registered sensor IDs in the memory 55 (Step S430).

Next, working and operations for registering sensor IDs of the air pressure sensor devices 10, 20, 30 and 40 in the memory 55 according to the second embodiment will be described hereinafter.

At first, the valves of the tires T1, T2, T3 and T4 are opened so that all four tires T1, T2, T3 and T4 are deflated. That is, deflation of all four tires T1, T2, T3 and T4 makes them substantially simultaneously punctured.

At that time, in Steps S10 to S40, each of the air pressure sensor devices 10, 20, 30 and 40 transmits the transmission information including each of the air pressures which represents a puncture of each of the tires T1, T2, T3 and T4. That is, each of the air pressures representing a puncture of each of the tires T1, T2, T3 and T4 is no more than the atmosphere pressure of 101 kPa.

When no check IDs are registered, as shown in FIG. 4, the determination of the control unit 54 in Step S320 is NO and the determination in Step S330 is YES because each of the air pressures representing a puncture of each of the tires T1, T2, T3 and T4 is no more than the atmosphere pressure of 101 kPa, so that the processes in Step S330 to Step S350 are performed by the control unit 54 whereby the sensor IDs substantially simultaneously received with the detected air pressures that are no more than the atmosphere pressure of 101 kPa are sequentially tentatively registered in the memory 55.

When the number of tentatively registered sensor IDs gets to be 4, that is, all four sensor IDs corresponding to all four pressure sensor devises 10, 20, 30 and 40 of all four tires T1, T2, T3 and T4 are tentatively registered in the memory 55, the count value C1 of the registration timer TM1 is reset to zero (zero second) so that the count of the registration timer TM1 is started up, shown in Step S360.

On the other hand, after deflating all four tires T1, T2, T3 and T4, a compressor and a suction hose communicatively connected thereto are prepared.

The valve of one of the tires T1, T2, T3 and T4, for example, the tire T1, is communicatively connected to the suction hose of the compressor so that air is pumped from the compressor into the tire T1, thereby increasing the air pressure in the tire T1 up to a predetermined air pressure of 201 kPa and over within 30 second.

At that time, when the control unit 54 receives the air pressure in the tire T1 and the determination in Step S330 is NO because the air pressure in the tire T1 is 201 kPa and over so that the processes in Step S370 to Step S410 are performed by the control unit 54 whereby the registration preparation flag of the pressure sensor device 10 corresponding to the tire T1 is set in the memory 55.

Next, the valve of one of the remained tires T2, T3 and T4, for example, the tire T2, is communicatively connected to the suction hose of the compressor so that air is pumped from the compressor into the tire T2, thereby increasing the air pressure in the tire T2 up to a predetermined air pressure of 201 kPa and over within 30 second.

At that time, when the control unit 54 receives the air pressure of the tire T2 and the determination in Step S330 is NO because the air pressure of the tire T2 is 201 kPa and over so that the processes in Step S370 to Step S410 are performed by the control unit 54 whereby the registration preparation flag of the pressure sensor device 20 corresponding to the tire T2 is set in the memory 55.

Similarly, air is pumped into each of the remained tires T3 and T4 so that the air pressure in each of the remained tires T3 and T4 is increased up to a predetermined air pressure of 201 kPa and over within 30 second.

When the control unit 54 receives each of the air pressures of the tires T3 and T4 so that the processes in Step S370 to Step S410 are performed by the control unit 54 whereby the registration preparation flags of the pressure sensor devices 30 and 40 corresponding to the tires T3 and T4 are sequentially set in the memory 55.

Then, because the compressor has the compression ability allowing the air pressure in each of the tires T1, T2, T3 and T4 to be increased up to the predetermined pressure of 201 kPa and over within 30 second, works of increasing the air pressures in all four tires T1, T2, T3 and T4 which are punctured up to the predetermined pressure of 201 kPa and over have sufficiently been completed within 5 minutes.

Therefore, after deflating all four tires T1, T2, T3 and T4, performing the works of increasing the air pressures in all four tires T1, T2, T3 and T4 up to the predetermined pressure of 201 kPa and over allows the sensor IDs of the air pressure sensor devices 10, 20, 30 and 40 corresponding to the tires T1, T2, T3 and T4 to be registered at vehicle assembling plants, dealerships or the like.

The above changes of air pressures in all four tires of each of other vehicles are unlikely to be happened in normal circumstances including, for example, in cases where the other vehicles are normal, such as the other vehicles are normally running.

In addition, the compressor having the ability of increasing the air pressure in a usual vehicle's tire up to a predetermined air pressure of 201 kPa and over within 30 second is equipped at the vehicle assembling plants, the dealerships or the like.

As a result, in the second embodiment, it is possible to effectively prevent other sensor IDs of tires of the other vehicles from being registered in error in the memory 55 of the own vehicle V due to interference of the other sensor IDs transmitted from other vehicles without adding any component having a function for preventing the occurrence of misregistration.

In addition, in the second embodiment of the present invention, the configuration of the tire air pressure monitoring system 1 allows the sensor ID registration processes to be performed without shifting the control unit 54 of the tire air pressure monitoring unit 50 to an ID registration mode, making it possible to prevent the tire air pressure monitoring unit 50 from shifting to an ID registration mode in error in a state that the tire air pressure monitoring unit 50 is supposed to perform a usual operation, such as in a state that the vehicle V is running.

Furthermore, in the second embodiment of the present invention, the configuration of the tire air pressure monitoring system 1 permits the sensor ID registration processes to be performed during the usual tire air pressure monitoring processes, making it possible to accurately indicate an alert when at least one of tires T1 to T4 fulfills the predetermined alert condition even in a case of starting the ID registration processes.

(Third Embodiment)

Next, a third embodiment of the invention will be described hereinafter.

Figure 5:
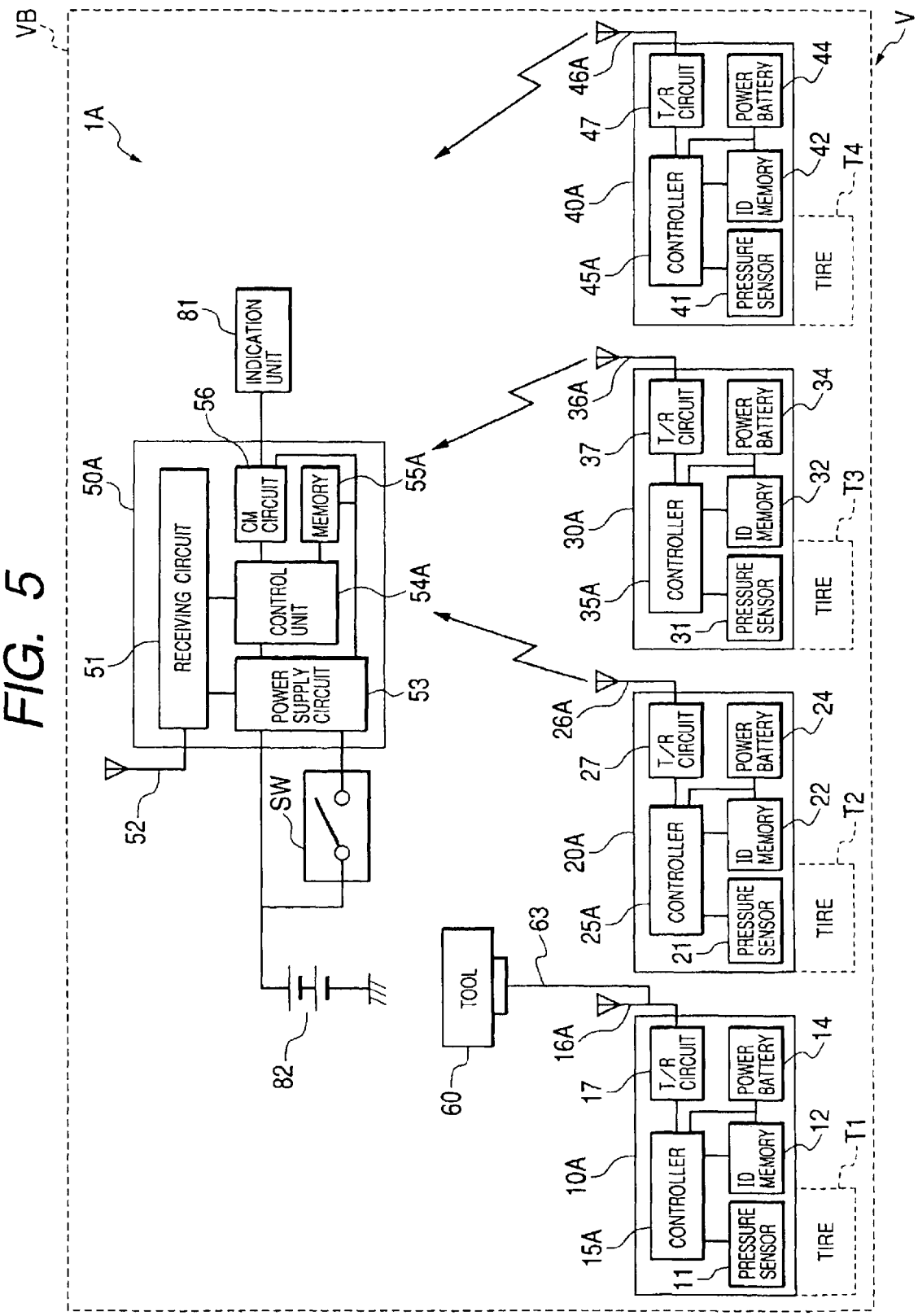
FIG. 5 is a block diagram schematically illustrating a structure of tire air pressure monitoring system installed in the vehicle body of the vehicle according to a third embodiment of the invention.

FIG. 5 is a block diagram schematically illustrating a structure of tire air pressure monitoring system 1A installed in the vehicle body VB of the vehicle V according to a third embodiment of the invention.

In the tire air pressure monitoring system 1A of the third embodiment, each of the air pressure sensor devices 10A, 20A, 30A and 40A comprises transmitting/receiving circuits (T/R circuits) 17, 27, 37 and 47 in place of transmission circuits 13, 23, 33 and 43. Each of the T/R circuits 17, 27, 37 and 47 is electrically connected to each of the antennas 16A, 26A, 36A and 46 for transmitting each of the sensor IDs through each of the antennas 16A, 26A, 36A and 46A. A tool 60 can be electrically removably connected to each of the antennas 16A, 26A, 36A and 46A for transmitting a trigger signal through each of the antennas 16A, 26A, 36A and 46A to each of the T/R circuits 17, 27, 37 and 47 so that each of the T/R circuits 17, 27, 37 and 47 is operative to receive the transmitted trigger signal.

Figure 6:
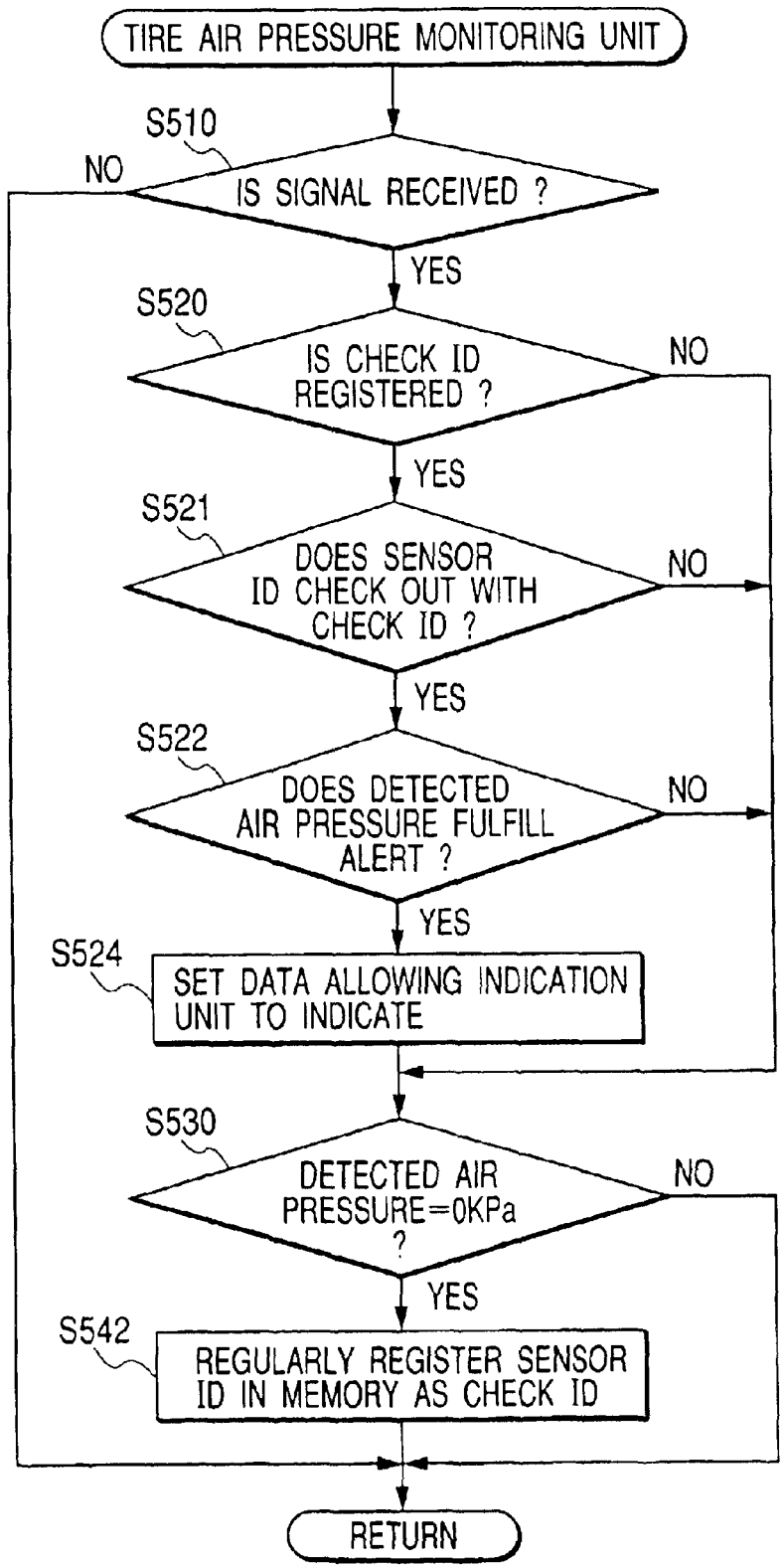
FIG. 6 is a flow chart schematically illustrating processes of tire air pressure monitoring unit shown in FIG. 5 according to the third embodiment.

Furthermore, in the third embodiment, a program (program product) installed in the memory 55A of the tire air pressure monitoring unit 50A is different from the programs related to the first embodiment and second embodiment so that the control unit 54A of the tire air pressure monitoring system 1A executes processes shown in afterward FIG. 6 in accordance with the program installed in the memory 55A.

Figure 7:
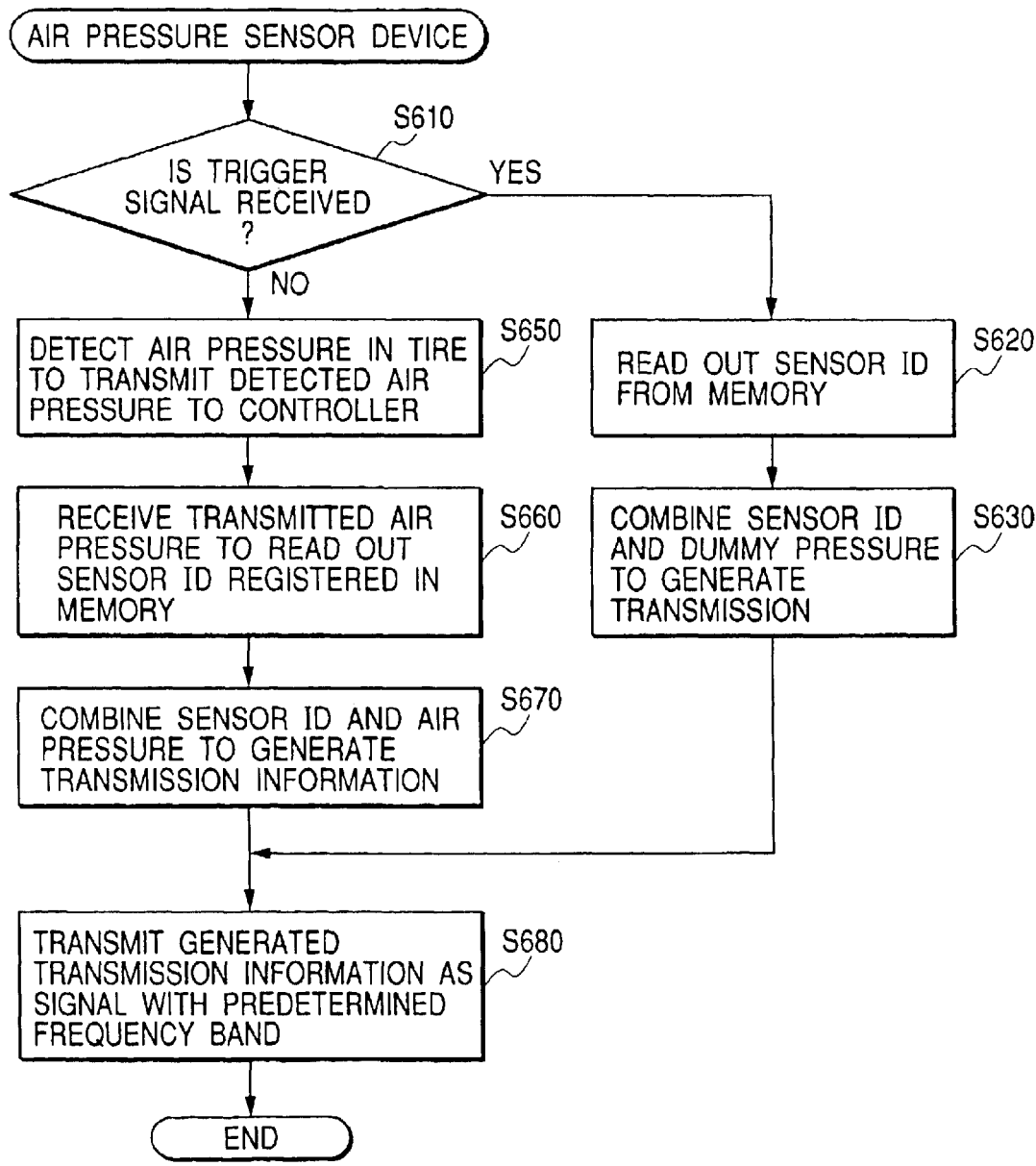
FIG. 7 is a flowchart schematically illustrating processes of each of air pressure sensor devices shown in FIG. 5 according to the third embodiment.

In addition, each of the air pressure sensor devices 10A, 20A, 30A and 40A performs processes shown in afterward FIG. 7.

Other elements of the tire air pressure monitoring system 1A shown in FIG. 5 are the same as those shown in FIG. 1 so that they are assigned to the same reference characters of the elements shown in FIG. 1.

Next, operations of the tire air pressure monitoring system 1A will now be described hereinafter.

That is, the control unit 54A of the tire air pressure monitoring unit 50A, in accordance with the program installed in the memory 55A, determines whether or not the signals each with the predetermined frequency band are received (FIG. 6; Step S510).

When determining that no signals each with the predetermined frequency band are received (the determination in Step S510 is NO), the control unit 54A of the tire air pressure monitoring unit 50A terminates execution of the processes to return the process in Step S510.

On the other hand, when at least one of the signals which has the predetermined frequency band is received through the antenna 52 and the receiving circuit 51 to be transmitted to the control unit 54A, the control unit 54A determines that the at least one of signals which has the predetermined frequency band is received (the determination in Step S510 is YES).

Next, the control unit 54A determines whether or not at least one of check IDs is registered in the memory 55A (Step S520), and when determining that no check IDs are registered in the memory 55 (the determination in Step S520 is NO), the control unit 54 shifts to afterward Step S530.

When determining that the at least one of check IDs is registered in the memory 55A (the determination in Step S520 is YES), the control unit 54A reads out the at least one of check IDs from the memory 55A to determine whether or not the at least one of sensor IDs included in the at least one of received signals checks out with the at least one of check IDs (Step S521).

When determining that the at least one of sensor IDs checks out with the at least one of check IDs (the determination in Step S521 is YES), the control unit 54A determines whether or not the at least one of detected air pressures included in the at least one of received signals fulfills the predetermined alert condition of each tire (Step S522).

When the control unit 54A determines that the at least one of detected air pressures fulfills the predetermined alert condition (the determination in Step S522 is YES), the control unit 54A sets the data allowing the indication unit 81 to indicate an alert (Step S524), whereby the indication unit 81 indicates an alert according to the set data.

On the other hand, when determining that the at least one of sensor IDs included in the at least one of received signals does not check out with the at least one of check IDs (the determination in Step S522 is NO), the control unit 54A determines whether or not the at least one of detected air pressures included in the at least one of received signals equals to the vacuum pressure of 0 (zero) kPa (Step S530).

When determining that the at least one of detected air pressures included in the at least one of received signals does not equal to the vacuum pressure (the determination in Step S530 is NO), the control unit 54A terminates execution of the processes to return the process in Step S510.

When determining that the at least one of detected air pressures included in the at least one of received signals does not equal to the vacuum pressure (the determination in Step S530 is NO), the control unit 54A terminates execution of the processes to return the process in Step S510.

When determining that the at least one of detected air pressures included in the at least one of received signals equals to the vacuum pressure (the determination in Step S530 is YES), the control unit 54 regularly registers the at least one of sensor IDs included in the at least one of received signals as the at least one of check IDs (Step S542).

On the other hand, each of the air pressure sensor devices 10A, 20A, 30A and 40A performs processes shown in FIG. 7.

That is, each of the controllers 15A, 25A, 35A and 45A determines whether or not the predetermined trigger signal is received through each of the T/R circuits 17, 27, 37 and 47 (FIG. 7; Step S610).

When determining that the predetermined trigger signal is received through each of the T/R circuits 17, 27, 37 and 47 (the determination in Step S610 is YES), each of the controllers 15A, 25A, 35A and 45A reads out each of the sensor IDs registered in the ID memories 12, 22, 32 and 42 therefrom (Step S620), and combines each of the read out sensor IDs and a dummy air pressure corresponding to the vacuum pressure, generating transmission information (Step S630).

On the other hand, when determining that the predetermined trigger signal is not received through each of the T/R circuits 17, 27, 37 and 47 (the determination in Step S610 is NO), each of the pressure sensors 11, 21, 31 and 41 of each of the air pressure sensor devices 10A, 20A, 30A and 40A detects an air pressure in each of the corresponding tires T1, T2, T3 and T4 to transmit each of the detected air pressures to each of the controllers 15A, 25A, 35A and 45A (Step S650).

Each of the controllers 15A, 25A, 35A and 45A receives each of the transmitted air pressures and reads out each of the sensor IDs registered in the ID memories 12, 22, 32 and 42 therefrom (Step S660).

Then, each of the controllers 15A, 25A, 35A and 45A combines each of the received air pressures and each of the read sensor IDs every sensor to generate transmission information (Step S670).

Each of the controllers, therefore, 15A, 25A, 35A and 45A transmits the generated transmission information generated in Step S630, or that generated in Step S670, as a signal with a predetermined frequency band through each of the T/R circuits 17, 27, 37 and 47 (Step S680).

These processes (Steps S610–S680) of each of the air pressure sensor devices 10A, 20A, 30A and 40A are periodically performed every predetermined time interval.

Next, working and operations for registering sensor IDs of the air pressure sensor devices 10A, 20A, 30A and 40A in the memory 55A according to the third embodiment will be described hereinafter.

At first, the signal line 63 connected to the tool 60 is connected to one of the antennas 16A, 26A, 36A and 46A of corresponding one of the sensor devices 10A, 20A, 30A and 40A which is the object of ID registration. For example, in order to perform the ID reservation with respect to the sensor device 10A, the trigger signal is transmitted from the tool 60 through the antenna 16A to the T/R circuit 17.

When the trigger signal is received through the T/R circuit 17 by the controller 15A, as shown in FIG. 7, the determination of the controller 15A in Step S610 is YES, so that the processes in Step S620, Step 630 and Step 680 are performed by the controller 15A, whereby the transmission information including the sensor ID of the sensor device 10A and the dummy air pressure corresponding to the vacuum pressure is transmitted as the signal with the predetermined frequency band to the tire air pressure monitoring unit 50A.

The signal having the predetermined frequency band is received by the control unit 54A so that the determination in Step S510 is YES.

At that time, when determining that the check ID corresponding to the sensor ID included in the received signal is not registered in the memory 55A, the determination in Step S520 or that in Step S521 of the control unit 54A is NO so that the process in Step S530 is performed.

Because the dummy air pressure included in the received signal corresponds to the vacuum pressure, the process in Step S540 is performed so that the sensor ID corresponding to the sensor device 10A is regularly registered as the check ID in the memory 55A.

Similarly, the connection of the signal line 63 is sequentially switched from the antenna 10A to the antennas 26A, 36A and 46A of the sensor devices 20A, 30A and 40A, respectively, and the trigger signal is sequentially transmitted from the tool 60 through the antennas 26A, 36A and 46A to the T/R circuits 27, 37 and 47, respectively.

Therefore, processes of the sensor devices 20A, 30A and 40A, which are similar to those of the sensor device 10A shown in FIG. 7 and processes of the tire air pressure monitoring unit 50A which are similar to those shown in FIG. 6 are performed so that the sensor IDs corresponding to the sensor devices 20A, 30A and 40A are regularly registered as the check IDs in the memory 55A.

The state that the actually detected air pressure in each of tires by each of the sensor devices of each of other vehicles becomes the vacuum pressure is unlikely to be happened in normal circumstances including, for example, in cases where the other vehicles are normal, such as the other vehicles are normally running.

In the third embodiment, therefore, it is possible to effectively prevent other sensor IDs of the tires of the other vehicles from being registered in error in the memory 55A of the own vehicle V due to interference of the other sensor IDs transmitted from other vehicles without adding any component having a function for preventing the occurrence of misregistration.

In addition, in the third embodiment of the present invention, the configuration of the tire air pressure monitoring system 1A allows the sensor ID registration processes to be performed without shifting the control unit 54A of the tire air pressure monitoring unit 50A to an ID registration mode, making it possible to prevent the tire air pressure monitoring unit 50A from shifting to an ID registration mode in error in a state that the tire air pressure monitoring unit 50A is supposed to perform a usual operation, such as in a state that the vehicle V is running.

Furthermore, in the third embodiment of the present invention, the configuration of the tire air pressure monitoring system 1A permits the sensor ID registration processes to be performed during the usual tire air pressure monitoring processes, making it possible to accurately indicate an alert when at least one of tires T1 to T4 fulfills the predetermined alert condition even in a case of starting the ID registration processes.

(Fourth Embodiment)

Next, a fourth embodiment of the invention will be described hereinafter.

Figure 8:
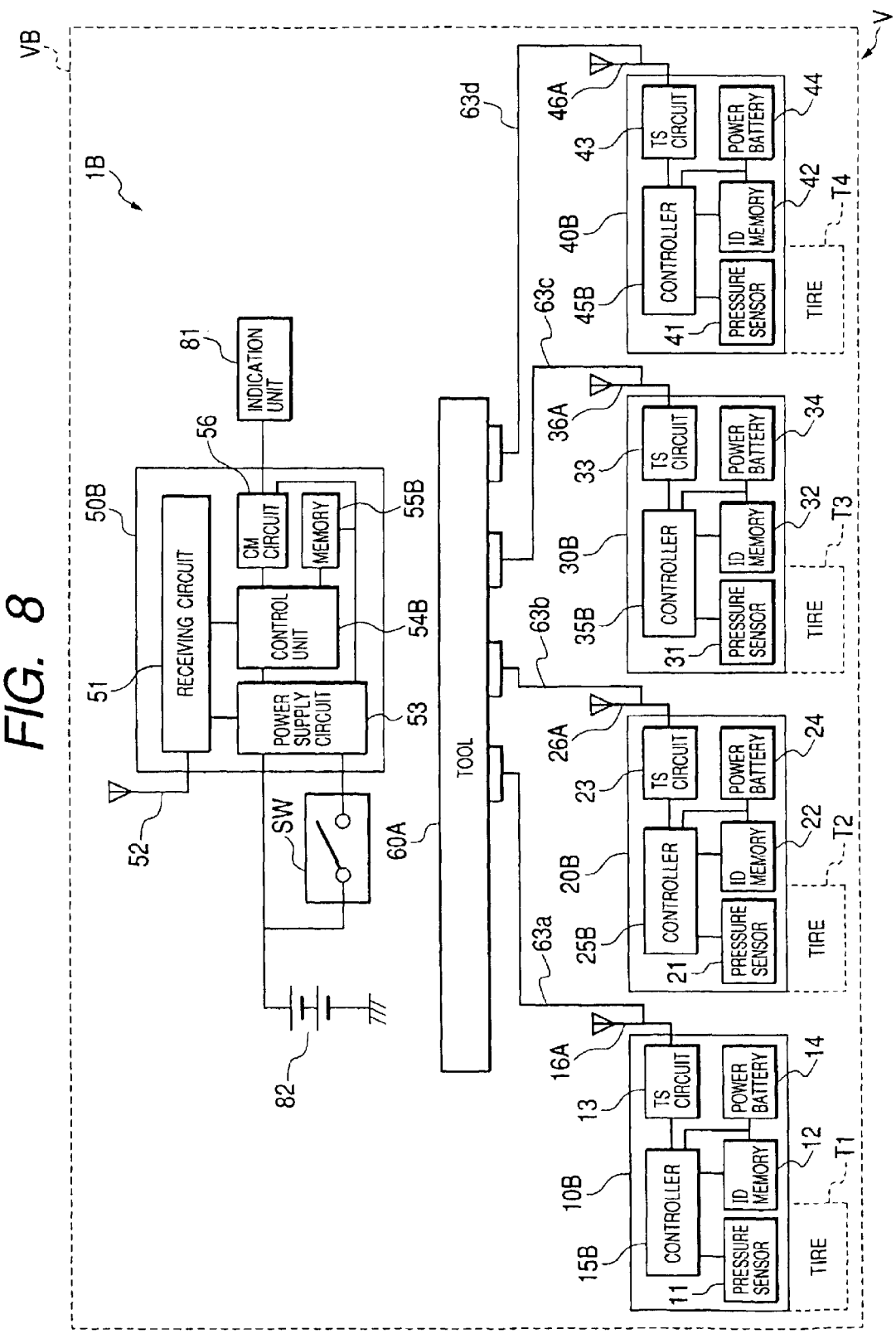
FIG. 8 is a block diagram schematically illustrating a structure of tire air pressure monitoring system installed in the vehicle body of the vehicle according to a fourth embodiment of the invention.

FIG. 8 is a block diagram schematically illustrating a structure of tire air pressure monitoring system 1B installed in the vehicle body VB of the vehicle V according to a fourth embodiment of the invention.

In the tire air pressure monitoring system 1B of the fourth embodiment, a tool 60A is prepared, which has four signal lines 63a, 63b, 63c and 63d connected thereto. The tool 60A can be electrically removably connected at each of the signal lines 63a, 63b, 63c and 63d to each of the antennas 16A, 26A, 36A and 46A for transmitting a trigger signal through each of the antennas 16A, 26A, 36A and 46A to each of the T/R circuits 17, 27, 37 and 47 so that each of the T/R circuits 17, 27, 37 and 47 is operative to receive the transmitted trigger signal.

Figure 9:
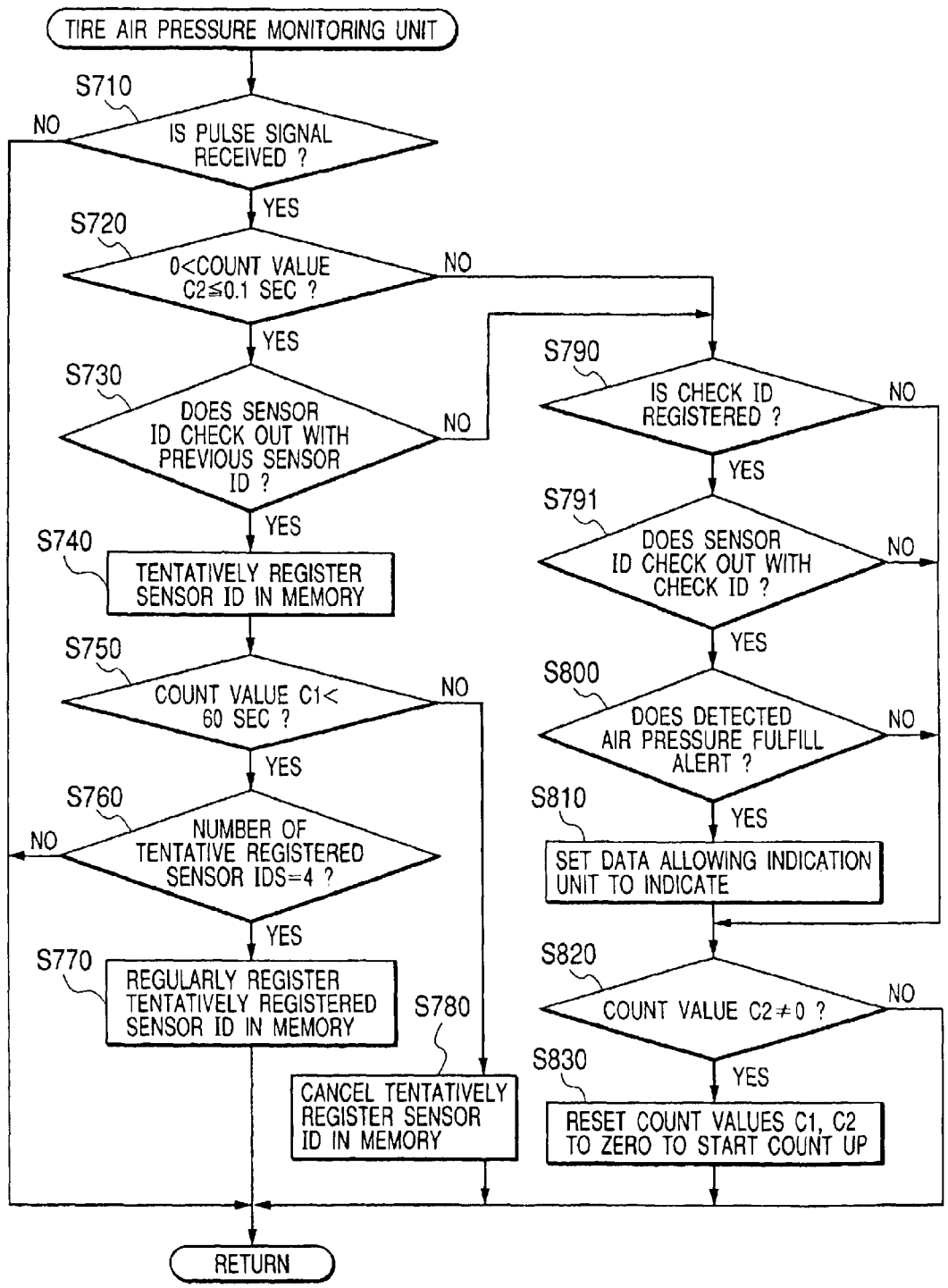
FIG. 9 is a flow chart schematically illustrating processes of tire air pressure monitoring unit shown in FIG. 8 according to the fourth embodiment.

Furthermore, in the fourth embodiment, a program (program product) installed in the memory 55B of the tire air pressure monitoring unit 50B is different from the programs related to the first, second and third embodiments so that the control unit 54B of the tire air pressure monitoring system 1B executes processes shown in afterward FIG. 9 in accordance with the program installed in the memory 55B.

The control unit 54B has a reception interval timer TM2 for counting up time and can reset the count value C2 of the timer TM2 to zero (zero second).

In addition, each of the air pressure sensor devices 10B, 20B, 30B and 40B performs processes shown in afterward FIG. 10.

Other elements of the tire air pressure monitoring system 1B shown in FIG. 8 are the same as those shown in FIG. 1 and FIG. 5 so that they are assigned to the same reference characters of the elements shown in FIG. 1 and FIG. 5.

Next, operations of the tire air pressure monitoring system 1B will now be described hereinafter.

That is, the control unit 54B of the tire air pressure monitoring unit 50B, in accordance with the program installed in the memory 55B, determines whether or not pulse signals are received (FIG. 9; Step S710).

When determining that no pulse signals are received (the determination in Step S710 is NO), the control unit 54B of the tire air pressure monitoring unit 50B terminates execution of the processes to return the process in Step S710.

On the other hand, when at least one of the pulse signals corresponding to the at least one of sensor devices is received through the antenna 52 and the receiving circuit 51 to be transmitted to the control unit 54B, the control unit 54B determines that the at least one of pulse signal is received (the determination in Step S710 is YES).

Next, the control unit 54B determines whether or not the count value C2 of the reception interval timer TM2 from which the previous pulse signal corresponding to the at least one of the sensor devices is received to which the at least one of the pulse signals corresponding thereto is received is within the range from more than 0 to no more than 0.1 see (Step S720).

When determining that the time interval is within the range from more than 0 to no more than 0.1 sec (the determination in Step S720 is YES), the control unit 54B determines whether or not the at least one of the sensor IDs included in the at least one of received pulse signals checks out with the previous received sensor ID (Step S730).

When determining that the at least one of sensor IDs checks out with the previous received sensor ID (the determination in Step S730 is YES), the control unit 54B tentatively registers the received sensor ID in the memory 55B (Step S740).

Next, the control unit 54B determines whether or not the count value C1 of the registration timer TM1 is less than 60 second (see) (Step S750).

In a case of determining that the count value C1 of the registration timer TM1 is less than 60 sec, that is, the determination in Step S750 is YES, the control unit 54B determines whether or not the number of the tentative registered sensor IDs becomes 4 (Step S760).

When determining that the number of the tentative registered sensor IDs becomes 4, that is, the determination in Step S760 is YES, the control unit 54B regularly registers the tentatively registered sensor IDs as the check IDs in the memory 55 (Step S770).

On the other hand, when determining that the number of the tentative registered sensor IDs does not become 4, that is, the determination in Step S760 is NO, the control unit 54B terminates execution of the processes to return the process in Step S710.

In addition, when determining that the count value C1 of the registration timer TM1 is no less than 60 sec, that is, the determination in Step S750 is NO, the control unit 54B cancels the tentatively registered sensor IDs in the memory 55 (Step S780).

On the other hand, in Step S720, when determining that the time interval is not within the range from more than 0 to no more than 0.1 see (the determination in Step S720 is NO), or, in Step S730, when determining that the at least one of sensor IDs does not check out with the previous received sensor ID (the determination in Step S730 is NO), the control unit 54B determines whether or not at least one of check IDs is registered in the memory 55B (Step S790), and when determining that no check IDs are registered in the memory 55B, that is, the determination in Step S790 is NO, the control unit 54B shifts to afterward Step S820.

When determining that the at least one of check IDs is registered in the memory 55B, that is, the determination in Step S790 is YES, the control unit 54B reads out the at least one of the check IDs from the memory 55B to determine whether or not the at least one of the sensor IDs included in the at least one of received signals checks out with the at least one of check IDs (Step S791).

When determining that the at least one of sensor IDs checks out with the at least one of check IDs, that is, the determination in Step S791 is YES, the control unit 54B determines whether or not the at least one of detected air pressures included in the at least one of received signals fulfills the predetermined alert condition of each tire (Step S800).

When determining that the at least one of detected air pressures included in the at least one of received signals does not fulfill the predetermined alert condition of each tire (the determination in Step S800 is NO), the control unit 54B shifts to afterward Step S820.

When the control unit 54B determines that the at least one of detected air pressures fulfills the predetermined alert condition (the determination in Step S800 is YES), the control unit 54B sets the data allowing the indication unit 81 to indicate an alert (Step S810), whereby the indication unit 81 indicates an alert according to the set data.

Next, the control unit 54B determines whether the count value C2 does not equal to zero, that is, the count value C2≠0 (Step S820).

When determining that the count value C2 equals to zero (the determination in Step S820 is NO), the control unit 54B terminates execution of the processes to return the process in Step S710.

When determining that the count value C2 does not equal to zero (the determination in Step S820 is YES), the control unit 54B resets the count values C1 and C2 of the registration timer TM1 and the reception interval timer TM2 to zero (zero second), respectively, to make each of the registration timer TM1 and the reception interval timer TM2 start a count up (Step S830).

On the other hand, each of the air pressure sensor devices 10B, 20B, 30B and 40B performs processes every 60 sec shown in FIG. 10.

Each of the controllers 15B, 25B, 35B and 45B of each of the devices 10B, 20B, 30B and 40B determines whether or not the predetermined trigger signal is received through each of the T/R circuits 17, 27, 37 and 47 (Step S910).

When determining that the predetermined trigger signal is received through each of the T/R circuits 17, 27, 37 and 47 (the determination in Step S910 is YES), each of the controllers 15B, 25B, 35B and 45B sets its operation mode to an ID reservation mode (Step S920).

That is, each of the controllers 15B, 25B, 35B and 45B operates in the ID reservation mode to set a number of transmission to five times (Step S930), and to set an interval of transmission to 0.1 sec (Step S940).

Next, each of the controllers 15B, 25B, 35B and 45B performs a transmission operation.

That is, each of the controllers 15B, 25B, 35B and 45B, as the transmission operation, reads out each of the sensor IDs registered in the ID memories 12, 22, 32 and 42 therefrom to generate transmission information including each of the read sensor IDs, transmitting the generated transmission information as pulse signals five times at 0.1 sec intervals through each of the T/R circuits 17, 27, 37 and 47 (Step S950).

On the other hand, when determining that the predetermined trigger signal is not received through each of the T/R circuits 17, 27, 37 and 47 (the determination in Step S910 is NO), each of the pressure sensors 11, 21, 31 and 41 of each of the air pressure sensor devices 10B, 20B, 30B and 40B detects an air pressure in each of the corresponding tires T1, T2, T3 and T4, and each of the controllers 15B, 25B, 35B and 45B determines whether or not each of the detected air pressures is abnormally reduced (Step S960).

When determining that each of the controllers 15B, 25B, 35B and 45B determines that each of the detected air pressures is abnormally reduced (the determination in Step S960 is YES), each of the controllers 15B, 25B, 35B and 45B sets its operation mode to an abnormality transmission mode (Step S970).

That is, each of the controllers 15B, 25B, 35B and 45B operates in the abnormality transmission mode to set a number of transmission to four times (Step S980), and to set an interval of transmission to 15 sec (Step S990).

Next, each of the controllers 15B, 25B, 35B and 45B performs a transmission operation.

That is, each of the controllers 15B, 25B, 35B and 45B, as the transmission operation in Step S950, reads out each of the sensor IDs registered in the ID memories 12, 22, 32 and 42 therefrom to combine each of the detected air pressures and each of the read sensor IDs every sensor to generate transmission information, transmitting the generated transmission information as pulse signals four times at 15 sec intervals through each of the T/R circuits each of the T/R circuits 17, 27, 37 and 47.

When determining that each of the controllers 15B, 25B, 35B and 45B determines that each of the detected air pressures is not abnormally reduced, that is, each of the detected air pressures is normal (the determination in Step S960 is NO), each of the controllers 15B, 25B, 355B and 45B sets its operation mode to a periodic transmission mode (Step S1000).

That is, each of the controllers 15B, 25B, 35B and 45B operates in the periodic transmission mode to set a number of transmission to one time (Step S1010).

Next, each of the controllers 15B, 25B, 35B and 45B performs a transmission operation.

That is, each of the controllers 15B, 25B, 35B and 45B, as the transmission operation in Step S950, reads out each of the sensor IDs registered in the ID memories 12, 22, 32 and 42 therefrom to combine each of the detected air pressures and each of the read sensor IDs every sensor to generate transmission information, transmitting the generated transmission information as a pulse signal once through each of the T/R circuits each of the T/R circuits 17, 27, 37 and 47.

Because the above processes of each of the controllers 15B, 25B, 35B and 45B are performed every 60 sec so that, when both of the determinations in Step S910 and Step S960 are NO, as shown in FIG. 11A, the pulse signals PA are transmitted at intervals of 60 sec.

In contrast, when the determination in Step S910 is NO, but that in Step S960 is YES, that is, each of the detected air pressures is abnormally reduced, as shown in FIG. 11B, the four pulse signals PB1 to PB4 are transmitted at intervals of 15 sec.

Furthermore, when the determination in Step S910 is YES, that is, the ID registration mode is set, as shown in FIG. 11C, the five pulse signals PC1 to PC5 are transmitted at intervals of 0.1 sec.

Next, working and operations for registering sensor IDs of the air pressure sensor devices 10B, 20B, 30B and 40B in the memory 55B according to the fourth embodiment will be described hereinafter.

At first, the signal line 63a, 63b, 63c and 63d connected to the tool 60 are connected to the antennas 16A, 26A, 36A and 46A of the sensor devices 10B, 20B, 30B and 40B, respectively. The trigger signals are transmitted from the tool 60 through the signal lines 63a, 63b, 63c and 63d to the antennas 16A, 26A, 36A and 46A so that the trigger signals are transmitted through the T/R circuit 17, 27, 37 and 47 to the controllers 15B, 25B, 35B and 45B, respectively.

When each of the trigger signals is received by each of the controllers 15B, 25B, 35B and 45B, as shown in FIGS. 10 and 11, the determination of each of the controllers 15B, 25B, 35B and 45B in Step S910 is YES, so that the processes in Step S920 to Step S950 are performed by each of the controllers 15B, 25B, 35B and 45B so that the pulse signals (PC1, PC2, PC3, PC4 and PC5) are sequentially transmitted five times from each of the sensor devices 10B, 20B, 30B and 40B to the tire air pressure monitoring unit 50B at 0.1 sec intervals.

The pulse signals PC1, PC2, PC3, PC4 and PC5 transmitted from each of the sensor devices 10B, 20B, 30B, 40B and SOB are received by the control unit 54B and, because the intervals of the pulse signals 10B, 20B, 30B, 40B and 50B are set to 0.1 sec, the determination in Step S720 is YES.

When, at first, the pulse signal, for example, PC1, transmitted from, for example, the sensor device 10B, is received by the control unit 55B, the determination in Step S720 is YES. Because the count value C2 of the reception interval timer TM2 is zero and no registered sensor IDs are registered in the memory 55B, the determination in Steps S730 and S790 are NO so that the control unit 54B shifts to the process in Step S820.

Because the count value C2 of the reception interval timer TM2 is zero, the determination in Step S820 is YES, and the count values C1 and C2 of the registration timer TM1 and the reception interval timer TM2 are reset so that the counts of the registration timer TM1 and the reception interval timer TM2 are started up, respectively (see Step S830).

At that time, when the control unit 54B receives the pulse signal, for example, pulse signal PC2, transmitted from the sensor device 10B within 0.1 sec after which the previous pulse signal PC1 previously transmitted from the same sensor device 10B is received, the determinations in Steps S710, S720 and S730 are YES, respectively. As a result, the process in Step S740 is performed so that the sensor ID of the sensor device 10B is tentatively registered in the memory 55B (see Step S740).

Unless all four sensor IDs of all four sensor devices 10B, 20B, 30B and 40B are tentatively registered in the memory 55B, the determination in Step S760 is NO so that the processes in Step S710 to S760 are repeatedly performed.

While the above processes in Step S710 to S760 are performed, when the count value C1 of the registration timer TM1 is no less than 60 sec (the determination in Step S750 is NO), the tentatively registered sensor ID is cancelled so that the processes in Step S710 to S760 are repeatedly performed.

While performing the above processes in Step S710 to S760, until the count value C1 of the registration timer TM1 is no less than 60 sec (the determination in Step S750 is YES), when the control unit 54B receives each of the pulse signals transmitted from each of the remained sensor devices 20B, 30B and 40B within 0.1 sec after which each of the previous pulse signals previously transmitted from each of the sensor devices 20B, 30B and 40B is received, each of the determinations in Steps S710, S720 and S730 is YES. As a result, the sensor IDs of the sensor devices 20B, 30B and 40B are tentatively registered in the memory 55B (see Step S740).

Because all sensor IDs of all sensor devices 10B, 20B, 30B and 40B are tentatively registered until the count value C1 of the registration timer TM1 is no less than 60 sec, the determination in Step S760 is YES, so that the tentatively registered sensor IDs are regularly registered in the memory 55B as the check IDs (see Step S760).

On the other hand, when each of the trigger signals is not received by the controllers 15B, 25B, 35B and 45B, as shown in FIGS. 10 and 11, the determination of each of the controllers 15B, 25B, 35B and 45B in Step S910 is NO.

When the detected air pressure of each of the sensor devices 10B, 20B, 30B and 40B is abnormally reduced (the determination in Step S960 is YES), the processes in Steps S970, S980, S990 and S950 in the abnormality transmission mode are performed by each of the controllers 15B, 25B, 35B and 45B so that the pulse signals (PB1, PB2, PB3 and PB4) are sequentially transmitted four times from each of the sensor devices 10B, 20B, 30B and 40B to the tire air pressure monitoring unit 50B at 15 sec intervals.

On the other hand, when the detected air pressure of each of the sensor devices 10B, 20B, 30B and 40B is not abnormally reduced (the determination in Step S960 is NO), the processes in Steps S1000, S1010 and S950 in the periodic transmission mode are performed by each of the controllers 15B, 25B, 35B and 45B so that the pulse signals (PA) are sequentially transmitted from each of the sensor devices 10B, 20B, 30B and 40B to the tire air pressure monitoring unit 50B at 60 sec intervals.

Because the intervals between the pulse signals PB1, PB2, PB3 and PB4 in the abnormality transmission mode, and the intervals between the pulse signals PA in the periodic transmission mode are clearly larger than those between the pulse signals (PC1~PC5) in the ID registration mode, the determination in Step S720 is NO so that the processes in Step S790 to S830 are performed.

That is, after the sensor IDs are registered in the memory 55B as the check IDs, when at least one of the pulse signals PB1, PB2, PB3, PB4 and PA is received by the control unit 54B, the sensor ID included in the at least one of received pulse signals PB1~PB4 and PA is checked with the corresponding one of check IDs (see Step S790).

When the sensor ID included in the at least one of received pulse signals checks out with the corresponding one of check IDs, the determination in Step S790 is YES so that, when the at least one of detected air pressures included in the at least one of received signals fulfills the predetermined alert condition of each tire (the determination in Step S800 is YES), the data allowing the indication unit 81 to indicate an alert is set, causing the indication unit 81 to indicate an alert.

As described above, the intervals between the pulse signals (PC1~PC5) in the ID registration mode are clearly difference from the intervals between the pulse signals PB1, PB2, PB3 and PB4 in the abnormality transmission mode, and the intervals between the pulse signals PA in the periodic transmission mode.

Because, in normal circumstances including in cases where other vehicles are normally running, it is impossible for the other vehicles to operate in the ID registration mode to transmit the pulse signals five times at intervals of 0.1 sec, thereby effectively preventing other sensor IDs of tires of the other vehicles from being registered in error in the memory 55B of the own vehicle V due to interference of the other sensor IDs transmitted from other vehicles without adding any component having a function for preventing the occurrence of misregistration.

In addition, in the fourth embodiment of the present invention, each of the controllers 10B, 20B, 30B and 40B operates in the ID registration mode only in cases where each of the controllers 10B, 20B, 30B and 40B receives the trigger signal so that, because the tool 60 is not connected to each of the antennas 16A, 26A, 36A and 46A while the vehicle V is normally running, it is possible to perform the sensor ID registration processes without shifting the control unit 54B of the tire air pressure monitoring unit 50B to the ID registration mode in error while the vehicle V is normally running.

Furthermore, in the fourth embodiment of the present invention, the configuration of the tire air pressure monitoring system 1B permits the sensor ID registration processes to be performed during the usual tire air pressure monitoring processes, making it possible to accurately indicate an alert when at least one of tires T1 to T4 fulfills the predetermined alert condition even in a case of starting the ID registration processes.

Incidentally, the ID registration operations may be performed while the operation mode of the tire air pressure monitoring system is shifted to the ID reservation mode.

That is, starting condition which allows the tire air pressure monitoring system to start the sensor ID registration operations only in the cases where the at least one of signals transmitted from the at least one of sensor devices corresponds to at least one of signals which is unlikely to be happened when the vehicle V is normal may be set, making it possible to prevent other sensor IDs of tires of the other vehicles from being registered in error in the memory of the own vehicle V according to signals transmitted from other sensor devices of the other vehicles.

Incidentally, in the first embodiment, the control unit performs the sensor ID registration processes when the detected air pressure is no more than the threshold pressure of, for example, the atmosphere pressure, such as 101 kPa, but one of other pressures may be set to the threshold pressure of the ID registration processes.

In addition, in the first embodiment, the tentative registered sensor IDs of the at least one of other vehicles are canceled every 60 sec by the processes of the control unit 54, but the present invention is not limited to the threshold value. That is, the tentative registered sensor IDs of the at least one of other vehicles may be canceled every short time, such as several tens of seconds.

Moreover, as the identification registration condition in the second embodiment, the pressure change is set so as to be rapidly increased, such as from the pressure of 101 kPa to that of 202 kPa within five minutes, but the present invention is not limited to this configuration.

That is, the pressure change may be set to be rapidly decreased or increased within a short time. In addition, the pressure change may be set so as to be rapidly increased and, after that, to be rapidly decreased, or the pressure change may be set so as to be rapidly decreased and, after that, to be rapidly increased.

Furthermore, in the third embodiment, the dummy pressure is set to the vacuum pressure, but one of other unlikely pressures may be set to the dummy pressure.

Still furthermore, in the fourth embodiment, the intervals of the pulse signals are set to 0.1 sec, but other unlikely intervals may be set to the intervals of the pulse signals.

While there has been described what is at present considered to be the embodiments and modifications of the invention, it will be understood that various modifications which are not described yet may be made therein, and it is intended to cover in the appended claims all such modifications as fall within the true spirit and scope of the invention.

This application is based upon and claims the benefit of priority of the prior Japanese Patent Application 2002-214997 filed on Jul. 24, 2002 so that the contents of which are incorporated herein by reference.

What is claimed is:

1. A method of registering an identifier of a tire air pressure sensor device in a tire air pressure monitoring unit in a vehicle, in which the tire air pressure sensor device is provided for a tire of the vehicle and communicable with the tire air pressure monitoring unit, said method comprising:

setting the tire air pressure monitoring unit in an identification registration condition, said identification registration condition allowing the tire air pressure monitoring unit to register the identifier of the tire air pressure sensor device when an unlikely signal is received, said unlikely signal being unlikely to be transmitted under normal circumstances;

transmitting the unlikely signal from the tire air pressure sensor device;

receiving the unlikely signal by the tire air pressure monitoring unit; and registering, by the tire air pressure monitoring unit, the identifier of the tire air pressure sensor device according to the identification registration condition in response to the receiving of the unlikely signal.

2. The method according to claim 1, wherein said unlikely signal includes data representing a predetermined air pressure in the tire detected by the tire air pressure sensor device, said predetermined air pressure is a pressure that is unlikely to be detected by the air pressure sensor device under normal circumstances, and said identification registration condition includes a case where the tire air pressure monitoring unit receives the unlikely signal.

3. The method according to claim 1, wherein said unlikely signal includes data representing an unlikely change of the air pressure in the tire detected by the tire air pressure sensor device, said unlikely change of the air pressure is unlikely to be detected by the air pressure sensor device under normal circumstances, and said identification registration condition includes a case where the tire air pressure monitoring unit receives the unlikely signal including the data representing the unlikely change of the air pressure.

4. The method according to claim 1, wherein said unlikely signal includes data representing a predetermined unlikely pressure generated by the tire air pressure sensor device, said predetermined unlikely pressure is unlikely to be detected by the air pressure sensor device under normal circumstances, and said identification registration condition includes a case where the tire air pressure monitoring unit receives the unlikely signal including the data representing the predetermined unlikely pressure.

5. The method according to claim 1, wherein said unlikely signal comprises pulse signals at unlikely intervals, said pulse signals at the unlikely intervals are unlikely to be transmitted from the tire air pressure sensor device under normal circumstances, and said identification registration condition includes a case where the tire air pressure monitoring unit receives the pulse signals at unlikely intervals.

6. The method according to claim 2, further comprising:
controlling the air pressure in the tire to supply/release air to/from the tire, wherein said detected air pressure in the tire detected by the tire air pressure sensor device corresponds to the controlled air pressure therein, and said controlled air pressure is unlikely to be detected by the air pressure sensor device under normal circumstances.

7. The method according to claim 6, wherein said controlled air pressure represents an air pressure of the tire which is no more than an atmosphere pressure.

8. The method according to claim 7, wherein said tire is one of a predetermined number of tires, said tire air pressure sensor device is one of a predetermined number of tire air pressure sensor devices corresponding to the predetermined number of tires so that said tire air pressure sensor devices are provided for the tires, respectively, said tire air pressure sensor devices have the identifiers, respectively, and wherein said identification registration condition allows the tire air pressure monitoring unit to register the identifiers of the tire air pressure sensor devices and is a condition in which the air pressure of each of the tires is are no more than the atmosphere pressure.

9. The method according to claim 3, further comprising:
controlling the air pressure in the tire to supply/release air to/from the tire,
wherein said unlikely change of the air pressure in the tire is a result of the control of the air pressure therein.

10. The method according to claim 9, wherein said air pressure in the tire changes to a first air pressure which is no more than an atmosphere pressure and to a second air pressure which is larger than the atmosphere pressure.

11. The method according to claim 4, further comprising:
providing externally a signal to the tire air pressure sensor device, and
wherein said unlikely pressure is generated by the tire air pressure sensor device as a dummy pressure in the tire according to the provided signal.

12. The method according to claim 11, wherein said generated unlikely pressure as the dummy pressure represents a vacuum pressure.

13. The method according to claim 1, wherein said unlikely signal and the identifier of the tire air pressure sensor device are transmitted with each other as transmission information, said receiving step includes receiving the transmission information by the tire air pressure monitoring unit and said registering step further comprises:
determining whether the transmission information is unlikely to be transmitted under normal circumstances; and
registering the identifier included in the transmission information signal in the tire air pressure monitoring unit as a check identifier when it is determined that the transmission information is unlikely to be transmitted under normal circumstances.

14. The method according to claim 13, further comprising:
determining, by the tire air pressure monitoring unit, whether the check identifier is registered therein;
determining, by the tire air pressure monitoring unit, whether the
identifier included in the transmission information signal corresponds with the registered check identifier when it is determined that the check identifier is registered in the tire air pressure monitoring unit;
determining, by the tire air pressure monitoring unit, whether the air pressure in the tire included in the transmission information signal is abnormal when it is determined that the identifier included in the transmission information signal corresponds with the registered check identifier; and
indicating an alert when it is determined that the air pressure in the tire included in the transmission information signal is abnormal,
wherein the determination of whether the transmission information is unlikely to be transmitted under normal circumstances is performed in a case where it is determined that the check identifier is not registered in the tire air pressure monitoring, and when it is determined that the identifier included in the transmission information signal does not correspond with the registered check identifier.

15. The method according to claim 14, wherein said tire is one of a predetermined number of tires, said tire air pressure sensor device is one of a predetermined number of tire air pressure sensor devices corresponding to the predetermined number of tires so that said tire air pressure sensor devices are provided for the tires, respectively, said tire air pressure sensor devices have identifiers, respectively, and said step of determining whether the transmission information is unlikely to be transmitted under normal circumstances further comprises:

determining whether the transmission information includes the unlikely signal;

tentatively registering the identifier included in the transmission information of an unlikely signal in the tire air pressure monitoring unit;

determining whether a predetermined time has elapsed from the start of the tentative registration; and determining whether a number of identifiers which are tentatively registered by the tentatively registering step is equal to the predetermined number of tires when it is determined that the predetermined time has not elapsed, and wherein the step of registering the identifier as a check identifier includes registering the tentatively registered identifiers when determining that the number of identifiers which are tentatively registered is equal to the predetermined number of tires.

16. A system with a memory in a vehicle for registering an identifier of a tire air pressure sensor device in the memory, in which the tire air pressure sensor device is provided for a tire of the vehicle, said system comprising:

a receiving unit configured to receive an unlikely signal which is transmitted from the tire air pressure sensor device, said unlikely signal being unlikely to be transmitted therefrom under normal circumstances; and a first registering unit configured to register the identifier of the tire air pressure sensor device in the memory in response to the receiving of the unlikely signal.

17. The system according to claim 16, wherein said unlikely signal and the identifier of the tire air pressure sensor device are transmitted with each other as transmission information, said receiving unit receives the transmission information and said first registering unit further comprises:

a first determining unit configured to determine whether the transmission information is unlikely to be transmitted under normal circumstances; and a second registering unit configured to register the identifier included in the transmission information signal in the memory as a check identifier when determining that the transmission information is unlikely to be transmitted under normal circumstances by the first determining unit.

18. The system according to claim 17, wherein said unlikely signal includes data representing a predetermined air pressure in the tire detected by the tire air pressure sensor device, said predetermined air pressure is unlikely to be detected by the air pressure sensor device under normal circumstances, and said first determining unit determines that the transmission information is unlikely to be transmitted under normal circumstances when the received unlikely signal includes the data representing the predetermined air pressure.

19. The system according to claim 17, wherein said unlikely signal includes data representing an unlikely change of the air pressure in the tire detected by the tire air pressure sensor device, said unlikely change of the air pressure is unlikely to be detected by the air pressure sensor device under normal circumstances, and said first determining unit determines that the transmission information is unlikely to be transmitted under normal circumstances when the received unlikely signal includes the data representing the unlikely change of the air pressure.

20. The system according to claim 17, wherein said unlikely signal includes data representing a predetermined unlikely pressure generated by the tire air pressure sensor device, said predetermined unlikely pressure is unlikely to be detected by the air pressure sensor device under normal circumstances, and said first determining unit determines that the transmission information is unlikely to be transmitted under normal circumstances when the received unlikely signal includes the data representing the predetermined unlikely pressure.

21. The system according to claim 17, wherein said unlikely signal comprises pulse signals at unlikely intervals, said pulse signals at the unlikely intervals are unlikely to be transmitted from the tire air pressure sensor device under normal circumstances, and said first determining unit determines that the transmission information is unlikely to be transmitted under normal circumstances when the received unlikely signal comprises the pulse signals at unlikely intervals.

22. The system according to claim 17, further comprising:

a second determining unit configured to determine whether the check identifier is registered in the memory;

a third determining unit configured to determine whether the identifier included in the transmission information signal corresponds with the registered check identifier when the second determining unit determines that the check identifier is registered in the memory;

a fourth determining unit configured to determine whether the air pressure in the tire included in the transmission information signal is abnormal in a case where the third determining unit determines that the identifier included in the transmission information signal corresponds with the registered check identifier; and an indicating unit configured to indicate an alert when the fourth determining unit determines that the air pressure in the tire included in the transmission information signal is abnormal, wherein said first determining unit is configured to determine whether the transmission information is unlikely to be transmitted under normal circumstances in a case where the second determining unit determines that the check identifier is not registered in the memory, or the third determining unit determines that the identifier included in the transmission information signal does not correspond with the registered check identifier.

23. The system according to claim 22, wherein said tire is one of a predetermined number of tires, said tire air pressure sensor device is one of a plurality of tire air pressure sensor devices corresponding to the predetermined number of tires so that said tire air pressure sensor devices are provided for the tires, respectively, said tire air pressure sensor devices each have identifiers, respectively, said first determining unit further comprises:

a fifth determining unit configured to determine whether the transmission information includes the unlikely signal;

a tentative registering unit configured to tentatively register the identifier included in the transmission information in the memory;

a sixth determining unit configured to determine whether a predetermined time has elapsed from the start of tentative registration in the tentative registering unit; and a seventh determining unit configured to determine whether a number of identifiers which are tentatively registered in the memory equals the predetermined number of tires when the sixth determining unit determines that the predetermined time has not elapsed, and wherein said second registering unit registers the tentatively registered identifiers when determining that the number of identifiers which are tentatively registered in the memory is equal to the predetermined number of tires.

24. A tire air pressure sensor device provided for a tire of a vehicle, said tire air pressure sensor device comprising:

an air pressure sensor configured to detect an air pressure in the tire;

a memory in which an identifier of the tire air pressure sensor device is stored;

a transmitting unit configured to transmit a transmission signal, said transmission signal including data representing the air pressure detected by the air pressure sensor and the a receiving unit configured to receive a trigger signal transmitted from an exterior of the tire air pressure sensor device; and the identifier;

a determining unit configured to determine whether the receiving unit has received the trigger signal, wherein said transmitting unit is configured to transmit an unlikely signal when the determining unit determines that the receiving unit has received the trigger signal, said unlikely signal being unlikely to be transmitted from the transmitting unit under normal circumstances.

25. The tire air pressure sensor device according to claim 24, wherein said transmitting unit is configured to transmit data representing an unlikely pressure as the unlikely signal when the determining unit determines that the receiving unit has received the trigger signal, said unlikely pressure being unlikely to be detected by the air pressure sensor under normal circumstances.

26. The tire air pressure sensor device according to claim 24, wherein said transmitting unit is configured to transmit pulse signals at unlikely intervals as the unlikely signal when the determining unit determines that the receiving unit has received the trigger signal, wherein said pulse signals at the unlikely intervals are unlikely to be transmitted from the tire air pressure sensor under normal circumstances.

27. A program product readable by a computer, in which the computer is installed in a vehicle and is communicable with a tire air pressure sensor device, and the tire air pressure sensor device is provided in association with a tire of the vehicle, said program product comprising:

first means for causing the computer to receive an unlikely signal which is transmitted from the tire air pressure sensor device, said unlikely signal being unlikely to be transmitted therefrom under normal circumstances; and second means for causing the computer to register an identifier of the tire air pressure sensor device in a memory in response to the receiving of the unlikely signal.

28. The program product according to claim 27, wherein said unlikely signal and the identifier of the tire air pressure sensor device are transmitted with each other as transmission information, said receiving means receives the transmission information and said first means further comprises:

third means for causing the computer to determine whether the transmission information is unlikely to be transmitted under normal circumstances; and fourth means for causing the computer to register the identifier included in the transmission information signal in the memory as a check identifier when determining that the transmission information is unlikely to be transmitted under normal circumstances.

29. The program product according to claim 28, further comprising:

fifth means for causing the computer to determine whether the check identifier is registered in the memory;

sixth means for causing the computer to determine whether the identifier included in the transmission information signal corresponds with the registered check identifier when determining that the check identifier is registered in the memory;

seventh means for causing the computer to determine whether the air pressure in the tire included in the transmission information signal is abnormal in a case of determining that the identifier included in the transmission information signal corresponds with the registered check identifier; and eighth means for causing the computer to set a data allowing an indication unit to indicate an alert when determining that the air pressure in the tire included in the transmission information signal is abnormal, wherein said computer in the third means determines whether the transmission information is unlikely to be transmitted under normal circumstances in a case where the computer in the fifth means determines that the check identifier is not registered in the memory, or the computer in sixth means determines that the identifier included in the transmission information signal does not correspond with the registered check identifier.

30. A method of registering identification data of tire air pressure sensor devices in a tire air pressure monitoring unit in a vehicle, wherein the tire air pressure sensor devices are associated with tires of the vehicle and can communicate with the tire air pressure monitoring unit, the method comprising:

transmitting unlikely signals from the tire air pressure sensor devices, respectively, wherein the unlikely signals are signals that are unlikely to be transmitted under normal operating conditions, and the unlikely signals include the identification data;

receiving the unlikely signals with the tire air pressure monitoring unit; and registering the identification data in response to the receiving of the unlikely signals.

* * * * *